United States Patent [19]
Shibata et al.

[11] Patent Number: 5,649,198
[45] Date of Patent: Jul. 15, 1997

[54] MAPPING CALCULATION UNITS BY DIVIDING A CALCULATION MODEL WHICH CAN BE CALCULATED IN PARALLEL ON AN APPLICATION PROGRAM

[75] Inventors: Kazuya Shibata; Masahide Fujisaki; Hiroyuki Kanazawa; Motoi Okuda, all of Kawasaki, Japan

[73] Assignee: Fujitsu Limited, Kawasaki, Japan

[21] Appl. No.: 714,527

[22] Filed: Sep. 16, 1996

Related U.S. Application Data

[63] Continuation of Ser. No. 108,546, Aug. 19, 1993, abandoned.

[30] Foreign Application Priority Data

Feb. 19, 1993 [JP] Japan ................................ 5-030971

[51] Int. Cl.$^6$ .................... G06F 9/40; G06F 15/16
[52] U.S. Cl. ................ 395/670; 395/800; 395/183.01; 364/230.3; 364/276.8; 364/281; 364/281.6; 364/281.7; 364/DIG. 1; 364/931.41; 364/942.5; 364/955.5; 364/975.5
[58] Field of Search ......................... 395/800, 775, 395/650, 183.01; 364/DIG. 1, DIG. 2

[56] References Cited

U.S. PATENT DOCUMENTS

| | | | |
|---|---|---|---|
| 3,614,745 | 10/1971 | Podvin | 395/650 |
| 4,683,549 | 7/1987 | Takaki | 395/775 |
| 5,056,000 | 10/1991 | Chang | 395/800 |
| 5,058,001 | 10/1991 | Li | 395/500 |
| 5,129,077 | 7/1992 | Hillis | 395/500 |
| 5,237,685 | 8/1993 | Toney | 395/800 |
| 5,255,385 | 10/1993 | Kikuchi | 395/575 |
| 5,390,336 | 2/1995 | Hillis | 395/800 |
| 5,410,696 | 4/1995 | Seki | 395/650 |
| 5,414,849 | 5/1995 | Yamamoto | 395/650 |

OTHER PUBLICATIONS

Robert H. Mozelos–Zaragoza et al; "Unequal Error Protection QPSK Modulation Codes" IEEE 1992; pp. 1121–1125.

*Primary Examiner*—Meng-Ai T. An
*Attorney, Agent, or Firm*—Staas & Halsey

[57] ABSTRACT

This invention aims to perform mapping in a user space without concern for an architecture of a parallel computer and to obtain a high-speed mapping pattern. An N-dimensional model is divided by a user into a plurality of calculation units. The calculation units and physical processors are assigned with an identification code. Correspondence therebetween is held on an address conversion table. By accessing the address conversion table, the user can freely perform a mapping operation. Thereafter, interprocessor communication is carried out by the use of the identification code assigned to the calculation units.

31 Claims, 31 Drawing Sheets

CELL: CELL PROCESSOR    BIF: BROADCAST NETWORK INTERFACE
RTC: ROUTING CONTROLLER

FIG. 23

```
 1  MAPFILE IS A 27.154
 2  # 3 DIMENSIONAL MAPPING
 3  # 10000 BYTES PER A LATTICE
 4  # 100 STEPS
 5  # SEND-DIRECTION 6
 6  # LOCELX= 3
 7  # LOCELY= 3
 8  # LOCELZ= 3
 9  (-,-,-) (-,-,-) (-,-,-) (-,-,-) (-,-,-) (-,-,-) (-,-,-) (-,-,-) (-,-,-)
10  (-,-,-) (-,-,-) (-,-,-) (-,-,-) (-,-,-) (-,-,-) (-,-,-) (-,-,-) (-,-,-)
11  (-,-,-) (-,-,-) (-,-,-) (-,-,-) (2,2,1) (1,2,1) (-,-,-) (-,-,-) (-,-,-)
12  (-,-,-) (-,-,-) (-,-,-) (2,1,1) (2,1,1) (1,2,2) (0,2,2) (-,-,-) (-,-,-)
13  (0,2,0) (2,2,0) (1,2,0) (2,1,1) (1,1,1) (2,2,2) (1,2,2) (0,2,2) (0,2,1)
14  (0,1,0) (2,1,0) (1,1,0) (1,0,1) (1,1,1) (2,1,2) (1,1,2) (0,1,2) (0,1,1)
15  (0,0,0) (2,0,0) (1,0,0) (1,0,1) (2,0,1) (2,0,2) (1,0,2) (0,0,2) (0,0,1)
16  (-,-,-) (-,-,-) (-,-,-) (-,-,-) (2,0,1) (-,-,-) (-,-,-) (-,-,-) (-,-,-)
17  # CREATING TASK ON 27 PE
18  # SENDING PARAMETER
19  # SENDING LOGICAL POSITION TO EACH CELL
20  # SENDING LOGICAL MAPPING
21  # WAITING STABLE
22  *** HOST_EXIT(0) ***
23  ===================================
24  MAX: 2.037274 MIN: 2.033902 AVE: 2.035016
```

⎫ MAPPING PATTERN (rows 9–16)

⟶ MEASURED TIME

FIG. 24

```
26  MAPFILE IS MAP.SKIP.27
27  # 3 DIMENSIONAL MAPPING
28  # 10000 BYTES PER A LATTICE
29  # 100 STEPS
30  # SEND-DIRECTION 6
31  # LOCELX= 3
32  # LOCELY= 3
33  # LOCELZ= 3
34  (0,0,0) (0,0,1) (0,1,0) (0,1,1) (0,1,1) (0,2,0) (0,2,0) (0,2,1) (-,-,-) (-,-,-) (-,-,-) (-,-,-)  ⎫
35  (-,-,-) (0,0,2) (-,-,-) (0,1,2) (0,1,2) (-,-,-) (-,-,-) (0,2,2) (-,-,-) (-,-,-) (-,-,-) (-,-,-)  │
36  (1,0,0) (1,0,1) (1,1,0) (1,1,1) (1,1,1) (1,2,0) (1,2,0) (1,2,1) (-,-,-) (-,-,-) (-,-,-) (-,-,-)  │ MAPPING
37  (-,-,-) (1,0,2) (-,-,-) (1,1,2) (1,1,2) (-,-,-) (-,-,-) (1,2,2) (-,-,-) (-,-,-) (-,-,-) (-,-,-)  ⎬ PATTERN
38  (2,0,0) (2,0,1) (2,1,0) (2,1,1) (2,1,1) (2,2,0) (2,2,0) (2,2,1) (-,-,-) (-,-,-) (-,-,-) (-,-,-)  │
39  (-,-,-) (2,0,2) (-,-,-) (2,1,2) (2,1,2) (-,-,-) (-,-,-) (2,2,2) (-,-,-) (-,-,-) (-,-,-) (-,-,-)  │
40  (-,-,-) (-,-,-) (-,-,-) (-,-,-) (-,-,-) (-,-,-) (-,-,-) (-,-,-) (-,-,-) (-,-,-) (-,-,-) (-,-,-)  │
41  (-,-,-) (-,-,-) (-,-,-) (-,-,-) (-,-,-) (-,-,-) (-,-,-) (-,-,-) (-,-,-) (-,-,-) (-,-,-) (-,-,-)  ⎭
42  # CREATING TASK ON 27 PE
43  # SENDING PARAMETER
44  # SENDING LOGICAL POSITION TO EACH CELL
45  # SENDING LOGICAL MAPPING
46  # WAITING STABLE
47  *** HOST_EXIT(0) ***
48  =====================================================
49  MAX: 1.805308 MIN: 1.802989 AVE: 1.803961   ⟶ MEASURED TIME
```

FIG. 25

```
51  MAPFILE IS MAP.TILE.27
52  # 3 DIMENSIONAL MAPPING
53  # 10000 BYTES PER A LATTICE
54  # 100 STEPS
55  # SEND-DIRECTION 6
56  # LOCELX= 3
57  # LOCELY= 3
58  # LOCELZ= 3
59  ( 0, 0, 0) ( 0, 1, 0) ( 0, 2, 0) ( 0, 0, 1) ( 0, 1, 1) ( 0, 2, 1) ( -, -, -) ( -, -, -) ( -, -, -)  ⎫
60  ( 1, 0, 0) ( 1, 1, 0) ( 1, 2, 0) ( 1, 0, 1) ( 1, 1, 1) ( 1, 2, 1) ( -, -, -) ( -, -, -) ( -, -, -)  ⎪
61  ( 2, 0, 0) ( 2, 1, 0) ( 2, 2, 0) ( 2, 0, 1) ( 2, 1, 1) ( 2, 2, 1) ( -, -, -) ( -, -, -) ( -, -, -)  ⎪
62  ( -, -, -) ( -, -, -) ( -, -, -) ( 0, 0, 2) ( 0, 1, 2) ( 0, 2, 2) ( -, -, -) ( -, -, -) ( -, -, -)  ⎪  MAPPING
63  ( -, -, -) ( -, -, -) ( -, -, -) ( 1, 0, 2) ( 1, 1, 2) ( 1, 2, 2) ( -, -, -) ( -, -, -) ( -, -, -)  ⎬  PATTERN
64  ( -, -, -) ( -, -, -) ( -, -, -) ( 2, 0, 2) ( 2, 1, 2) ( 2, 2, 2) ( -, -, -) ( -, -, -) ( -, -, -)  ⎪
65  ( -, -, -) ( -, -, -) ( -, -, -) ( -, -, -) ( -, -, -) ( -, -, -) ( -, -, -) ( -, -, -) ( -, -, -)  ⎪
66  ( -, -, -) ( -, -, -) ( -, -, -) ( -, -, -) ( -, -, -) ( -, -, -) ( -, -, -) ( -, -, -) ( -, -, -)  ⎭
67  # CREATING TASK ON 27 PE
68  # SENDING PARAMETER
69  # SENDING LOGICAL POSITION TO EACH CELL
70  # SENDING LOGICAL MAPPING
71  # WAITING STABLE
72  *** HOST_EXIT(0) ***
73  =-=-=-=-=-=-=-=-=-=-=-=-=-=-=-=-=-=-=-=
74  MAX: 1.752943 MIN: 1.748959 AVE: 1.750421   ⟶ MEASURED TIME
75  =-=-=-=-=-=-=-=-=-=-=-=-=-=-=-=-=-=-=-=
```

FIG. 26

```
1   MAPFILE IS A 64.320
2   # 3 DIMENSIONAL MAPPING
3   # 10000 BYTES PER A LATTICE
4   # 100 STEPS
5   # SEND-DIRECTION 6
6   # LOCELX= 4
7   # LOCELY= 4
8   # LOCELZ= 4
9   (3,1,0) (2,2,0) (3,2,0) (3,2,3) (2,2,3) (3,1,3) (2,1,3) (2,1,0)
10  (3,1,1) (2,2,1) (3,2,1) (3,2,2) (2,2,2) (3,1,2) (2,1,2) (2,1,1)
11  (0,1,1) (1,2,1) (0,2,1) (0,2,2) (1,2,2) (0,1,2) (1,1,2) (1,1,1)
12  (3,0,1) (2,3,1) (3,3,1) (3,3,2) (2,3,2) (3,0,2) (2,0,2) (2,0,1)
13  (0,0,1) (1,3,1) (0,3,1) (0,3,2) (1,3,2) (0,0,2) (1,0,2) (1,0,1)
14  (0,0,0) (1,3,0) (0,3,0) (0,3,3) (1,3,3) (0,0,3) (1,0,3) (1,0,0)
15  (3,0,0) (2,3,0) (3,3,0) (3,3,3) (2,3,3) (3,0,3) (2,0,3) (2,0,0)
16  (0,1,0) (1,2,0) (0,2,0) (0,2,3) (1,2,3) (0,1,3) (1,1,3) (1,1,0)
17  # CREATING TASK ON 64 PE
18  # SENDING PARAMETER
19  # SENDING LOGICAL POSITION TO EACH CELL
20  # SENDING LOGICAL MAPPING
21  # WAITING STABLE
22  *** HOST_EXIT(0) ***
23  -=-=-=-=-=-=-=-=-=-=-=-=-=-=-=-=-=-=-=-=
24  MAX: 1.819263 MIN: 1.817908 AVE: 1.818579
```

Lines 9–16 form the MAPPING PATTERN.

FIG. 27

```
26  MAPFILE IS MAP.SKIP.64
27  # 3 DIMENSIONAL MAPPING
28  # 10000 BYTES PER A LATTICE
29  # 100 STEPS
30  # SEND-DIRECTION 6
31  # LOCELX= 4
32  # LOCELY= 4
33  # LOCELZ= 4
34  (0,0,0)  (0,0,1)  (0,1,0)  (0,1,1)  (0,2,0)  (0,2,1)  (0,3,0)  (0,3,1)
35  (0,0,3)  (0,0,2)  (0,1,3)  (0,1,2)  (0,2,3)  (0,2,2)  (0,3,3)  (0,3,2)
36  (1,0,0)  (1,0,1)  (1,1,0)  (1,1,1)  (1,2,0)  (1,2,1)  (1,3,0)  (1,3,1)
37  (1,0,3)  (1,0,2)  (1,1,3)  (1,1,2)  (1,2,3)  (1,2,2)  (1,3,3)  (1,3,2)
38  (2,0,0)  (2,0,1)  (2,1,0)  (2,1,1)  (2,2,0)  (2,2,1)  (2,3,0)  (2,3,1)
39  (2,0,3)  (2,0,2)  (2,1,3)  (2,1,2)  (2,2,3)  (2,2,2)  (2,3,3)  (2,3,2)
40  (3,0,0)  (3,0,1)  (3,1,0)  (3,1,1)  (3,2,0)  (3,2,1)  (3,3,0)  (3,3,1)
41  (3,0,3)  (3,0,2)  (3,1,3)  (3,1,2)  (3,2,3)  (3,2,2)  (3,3,3)  (3,3,2)
42  # CREATING TASK ON 64 PE
43  # SENDING PARAMETER
44  # SENDING LOGICAL POSITION TO EACH CELL
45  # SENDING LOGICAL MAPPING
46  # WAITING STABLE
47  *** HOST_EXIT(0) ***
48  =|=|=|=|=|=|=|=|=|=|=|=|=|=|=|=|=|=|=|=|=|=
49  MAX: 1.679813 MIN: 1.679192 AVE: 1.679333
50  =|=|=|=|=|=|=|=|=|=|=|=|=|=|=|=|=|=|=|=|=|=
```

FIG. 28

```
52  # 3 DIMENSIONAL MAPPING
53  # 10000 BYTES PER A LATTICE
54  # 100 STEPS
55  # SEND-DIRECTION 6
56  # LOCELX= 4
57  # LOCELY= 4
58  # LOCELZ= 4
59  (0,0,0) (0,1,0) (0,2,0) (0,3,0) (0,0,1) (0,1,1) (0,2,1) (0,3,1)
60  (1,0,0) (1,1,0) (1,2,0) (1,3,0) (1,0,1) (1,1,1) (1,2,1) (1,3,1)
61  (2,0,0) (2,1,0) (2,2,0) (2,3,0) (2,0,1) (2,1,1) (2,2,1) (2,3,1)
62  (3,0,0) (3,1,0) (3,2,0) (3,3,0) (3,0,1) (3,1,1) (3,2,1) (3,3,1)
63  (0,0,3) (0,1,3) (0,2,3) (0,3,3) (0,0,2) (0,1,2) (0,2,2) (0,3,2)
64  (1,0,3) (1,1,3) (1,2,3) (1,3,3) (1,0,2) (1,1,2) (1,2,2) (1,3,2)
65  (2,0,3) (2,1,3) (2,2,3) (2,3,3) (2,0,2) (2,1,2) (2,2,2) (2,3,2)
66  (3,0,3) (3,1,3) (3,2,3) (3,3,3) (3,0,2) (3,1,2) (3,2,2) (3,3,2)
67  # CREATING TASK ON 64 PE
68  # SENDING PARAMETER
69  # SENDING LOGICAL POSITION TO EACH CELL
70  # SENDING LOGICAL MAPPING
71  # WAITING STABLE
72  *** HOST_EXIT(0) ***
73  =-=-=-=-=-=-=-=-=-=-=-=-=-=-=-=-=-=-=-=-=-=
74  MAX: 1.887382 MIN: 1.884576 AVE: 1.885689
75  =-=-=-=-=-=-=-=-=-=-=-=-=-=-=-=-=-=-=-=-=-=
```

FIG. 29

| TECHNIQUE | MAPPING PATTERN | SYSTEM | TOTAL SUM L OF DISTANCES |
|---|---|---|---|
| CONCEPTIONAL MAPPING | A | $3^3 \rightarrow 8^2$ | 180 |
| | | $4^3 \rightarrow 8^2$ | 320 |
| | B | $3^3 \rightarrow 8^2$ | 180 |
| | | $4^3 \rightarrow 8^2$ | 448 |
| | C | $3^3 \rightarrow 8^2$ | 154 |
| ANNEALING | D | $4^3 \rightarrow 8^2$ | 320 |

FIG. 30

1. TYPE OF ACQUIRED INFORMATION (ENTRY KEY)
   1: NUMBER OF DIMENSIONS OF PARTITION OF UNITS
   2: MAPPING TABLE
2. NUMBER OF DIMENSIONS OF CALCULATION MODEL: M (ENTRY KEY)
   1 ~ 10
3. DATA REFERENCE RELATIONSHIP: R (ENTRY KEY)
   1: NEAREST NEIGHBORHOOD PE
   2: NEIGHBORHOOD PE (INCLUDING OBLIQUE SIDES)
   3: ALL PEs
   4 OR MORE: DESIGNATED BY USER
              DESIGNATE REFERENCE PE BY INDIRECT ADDRESS FROM OWN PE (0,-1), (1,-1)....
4. NUMBER OF PEs: N (ENTRY KEY)
   1 ~ 1024
5. AMOUNT OF TRANSMISSION DATA PER UNIT: D (ENTRY KEY)
   1 ~ 4: 1 ~ 10000 (BYTE)
   5 OR MORE: DESIGNATED BY USER
6. NUMBER OF DIMENSIONS OF PARTITION OF UNITS: UM (OUTPUT 1)
   1 ~ M - 1
7. MAPPING TABLE (OUTPUT 2)
   LOGICAL PE NUMBER  BLOCK UNIT NUMBER

MAPPING CALCULATION UNITS BY DIVIDING A CALCULATION MODEL WHICH CAN BE CALCULATED IN PARALLEL ON AN APPLICATION PROGRAM

This application is a continuation of application Ser. No. 08/108,546, filed Aug. 19, 1993, now abandoned.

BACKGROUND OF THE INVENTION

This invention relates to a method of mapping a calculation model in a parallel computer and, in particular, to a technique of efficiently carrying out a mapping operation in a parallel computer to achieve efficient communication.

With an increased demand for a computer system which is operable at a high speed and has a large capacity, a scattered processing technique is required to scatter processing to a plurality of processors.

To this end, there is provided a parallel computer which includes a plurality of processors for carrying out processing in a parallel fashion. In the parallel computer, the processors communicate with one another through communication means so that the processors are operable in a parallel fashion to perform particular integrated processing by a mass of the processors. Thus, the processing speed for one job can be increased.

In recent years, such a parallel computer has been rapidly developed. Environment for parallelization is gradually improved. Practical application becomes available.

However, it is impossible at present to automatically carry out various operations, such as a mapping operation, essential in the course of parallelization. In particular, a network architecture of the parallel computer must be taken into consideration in order to create an algorithm of data division or functional division upon the mapping operation (hereinafter referred to as a division algorithm).

Since a wide variety of network architectures are adopted in parallel computers, an ordinary user must fully consider the architecture of his machine in order to create an efficient program.

When the architecture of the parallel computer is improved, the parallel application program thus created must be modified in accordance with the improved architecture.

Accordingly, the parallel application program will not be able to follow the variation of the architecture of the parallel computer, in fact.

In this situation, accumulation of highly adaptable parallel application programs can not be expected.

Notwithstanding the circumstance of the present status described above, some progressive users fully consider the architecture to produce high speed application programs.

On the other hand, in order to bring parallel computers into wide use, it is necessary to establish such an environment that enables an ordinary user to create a parallel application program without concern for the division algorithm. To this end, taking the convenience of use alone into consideration, it is desired that the parallel application program can be created in accordance with a user's image of a N-dimensional calculation model. On the other hand, in view of an increase in speed of the application program, it is necessary to carry out a mapping operation corresponding to the calculation model of the progressive users.

Accordingly, an interface easily used by the user and operable at a high speed is required with respect to the data reference patterns often appearing In the application program.

In view of such a demand, it is an object of this invention to enable a user of a parallel computer to create or run an application program without concern for an architecture of the parallel computer.

SUMMARY OF THE INVENTION

In order to achieve the above-mentioned object, this invention provides a parallel computer which Includes a plurality of processors for carrying out processing in a parallel fashion by transferring data and information among the processors from one to another through communication means and which has a following structure.

In the parallel computer according to this invention, correspondence between calculation units obtained by dividing a calculation model and a plurality of physical processors as an architecture of the parallel computer is established through an address conversion table.

Herein, the calculation model to be executed and processed at a user's demand may be a three-dimensional model or any N-dimensional (N being a natural number) model. The N-dimensional calculation model is divisioned into a plurality of calculation units having identification codes.

A physical processor array includes a plurality of physical processors (PE) each of which is assigned with an identification code.

The address conversion table establishes correspondence between the calculation units and the processors by the use of the identification codes.

There are various calculation models which the user wants to calculate. In many cases, a data reference pattern inherent to an application program is present and a calculation model has a multi-dimensional structure not less than three dimension. Thus, the calculation model is often different from an arrangement of the network architecture. in order to solve the above-mentioned problem, it is necessary to reflect such situation.

Taking the above into consideration, it is necessary to define an interface in order to enable the user to work in accordance with an image of the calculation model without concern for the architecture. The interface makes the user have an image as if the physical processor array has a structure similar to the calculation model of the user. Interprocessor communication is carried out in accordance with the image of a space (user space). Such interface is realized by the above-mentioned structure.

Through the user interface, the calculation units are desiredly mapped into the processors.

A mapping operation is a process after the calculation model is divisioned into calculation area units which can be calculated in parallel on the application program. The mapping operation is to allot the respective units to the respective processors in the parallel computer. It is noted here that each calculation area unit may be either a smallest unit which can be calculated in parallel on the application program or a unit block comprising a combination of several smallest units.

BRIEF DESCRIPTION OF THE DRAWING

FIG. 23 shows a result when $3^3$ is mapped into $8^2$ by the annealing method;

FIG. 24 shows a result when $3^3$ is mapped into $8^2$ by a skip method;

FIG. 25 shows a result when $3^3$ is mapped into $8^2$ by a tile method;

FIG. 26 shows a result when $4^3$ is mapped into $8^2$ by the annealing method;

FIG. 27 shows a result when $4^3$ is mapped into $8^2$ by the skipping method;

FIG. 28 shows a result when $4^3$ is mapped into $8^2$ by the tile method;

FIG. 29 shows a relationship between evaluation functions dependent upon mapping techniques and measured communication times;

FIG. 30 shows a file format of an optimum mapping information database

DESCRIPTION OF PREFERRED EMBODIMENT

Figure 1:
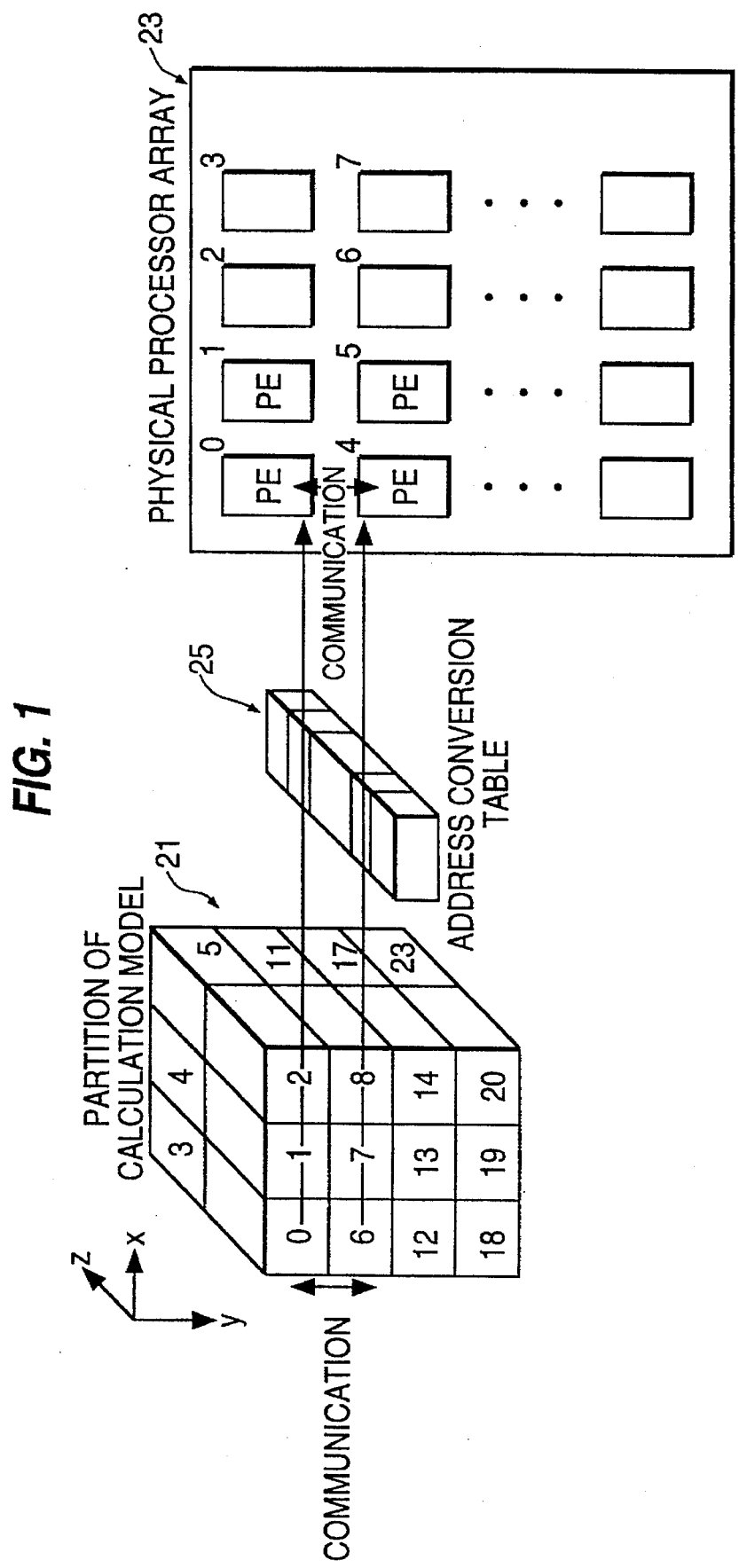
FIG. 1 is a view for describing a concept of a user interface according to this invention.

Now, description will be made as regards a preferred embodiment of this invention with reference to the drawing.

As illustrated in FIG. 1, in a parallel computer, correspondence between calculation units obtained by dividing a calculation model and a plurality of physical processors as an architecture of the parallel computer is established through an address conversion table.

Referring to FIG. 1, a reference numeral 21 represents an N-dimensional calculation model 21 to be executed and processed at a user's demand. Although a three-dimensional model is used here, any N-dimensional (N being a natural number) model can be used. The N-dimensional calculation model is divisioned into a plurality of calculation units having identification codes.

A physical processor array is depicted by 23. Herein, a two-dimensional array is adopted. A plurality of physical processors (PE) are assigned with identification codes.

An address conversion table 25 establishes correspondence between the calculation units and the processors by the use of the identification codes.

It is possible to understand this invention as a method, a library program, or a parallel computer itself.

At first, there is provided a method of carrying out parallel processing by a plurality of processors in a parallel computer to calculate an N-dimensional calculation model to be executed and processed at a user's demand. The method comprises the steps of dividing the N-dimensional calculation model into a plurality of calculation units having identification codes and establishing correspondence between the calculation units and the processors to thereby provide a user interface. The method further comprises the step of desiredly mapping the calculation units into the processors through the interface. Thereafter, interprocessor communication is carried out by the use of the identification codes assigned to the calculation units.

When the method is formed into a library program, there is provided a communication library program for use in a parallel computer, comprising a dividing routine for dividing an N-dimensional calculation model into a plurality of calculation units having identification codes, a supervising routine for establishing on an address conversion table correspondence between the identification codes of the calculation units and the identification codes assigned to a plurality of processors, and a mapping routine for desiredly mapping the calculation units into the processors. Interprocessor communication is carried out by the use of the identification codes assigned to the calculation units. This library program is added to a conventional library group as an N-dimensional subroutine library program.

By execution of such a library program, there is provided a parallel computer comprising a calculation model dividing section for dividing an N-dimensional calculation model into a plurality of calculation units having identification codes, a supervising section for establishing on an address conversion table correspondence between the calculation units and a plurality of processors assigned with identification codes, and a mapping section for desiredly mapping the calculation units into the processors.

In the foregoing, it is necessary to perform optimum mapping corresponding to the calculation model. The optimum mapping is such that interprocessor communication is most efficiently realized in view of an increase of the speed with respect to the data reference pattern of the application program.

In principle, it is desirable to automatically select an optimum pattern for a mapping operation into a processor space. However, a data reference pattern inherent to the application program is known to a user alone. Accordingly, mapping is not satisfactorily carried out in many parallel computer systems so far. In addition, an optimum mapping technique itself involves an unobvious portion. In view of the above, this invention at first aims to find out an optimum mapping rule corresponding to each communication pattern. To this end, something which enables a user to freely control a mapping rule is required.

A user interface which meets such a demand is provided by the above-mentioned structure.

Upon mapping, a data reference relationship of the application program must be taken into consideration in addition to the network architecture, in order to increase the communication speed. In this connection, determination of mapping is treated as an increase of the communication speed as described above. An evaluation function of a communication time is established for the purpose of minimization of the communication time.

By adopting an annealing method as an algorithm of minimization of the communication time, it is possible to minimize the communication time on the parallel computer.

In case of a typical data reference relationship, it is desirable that optimum mapping information is obtained in a shortest time without solving the optimization problem by the user.

The typical data reference relationship includes those empirically appearing in application programs, for example, nearest neighborhood reference, neighborhood reference, all to all.

In case of a data reference relationship inherent to a particular user, the optimization problem is preliminarily solved and registered in an optimum mapping information database. Thus, in the manner similar to the case of the typical data reference relationship, it is possible to obtain the optimum mapping information simply by accessing the database from the application program.

The data reference relationship inherent to the user is strongly dependent upon the user and is poor in generality except the above-mentioned data reference pattern. It is an extremely rare data reference pattern such as "every third" or "only a particular area".

On preparation of the optimum mapping information database, definition is made of the data reference relationship, an interprocessor data amount per calculation unit, and the number of the processors. By the use of a mapping optimization technique, the mapping information is produced as the database.

Once the database is established, reference is made to the database upon parallel processing. Appropriate mapping corresponding to the calculation model is selected and processing is performed.

According to this invention, there is provided the user interface illustrated in FIG. 1. The identification codes are assigned to the calculation units of the N-dimensional model divisioned by the user and the physical processors. Correspondence therebetween is held on the address conversion table. By simply accessing the address conversion table, the user can freely perform the mapping operation.

Thereafter, interprocessor communication can be carried out by the use of the identification codes of the calculation units. Thus, a work in the user space is realized. It is possible to freely perform the mapping operation in correspondence to the N-dimensional calculation model.

Now, this invention will be described in conjunction with a more detailed embodiment.

Herein, description will be made in connection with a research conducted on a parallel computer AP1000. A method of realizing the user interface will be described together with an optimum mapping method for a typical data reference pattern.

<AP1000>

At first, the parallel computer AP1000 will be described with reference to FIGS. 2 and 3.

AP1000 is a parallel computer of an MIMD (Multi Instruction stream Multi Data stream) type comprising a plurality of processors connected in a two-dimensional torus arrangement. The parallel computer has three communication networks. A torus network is used for communication among the processors (PE). To optimize communication between PEs, a characteristic of the network must be taken into consideration.

Figure 2:
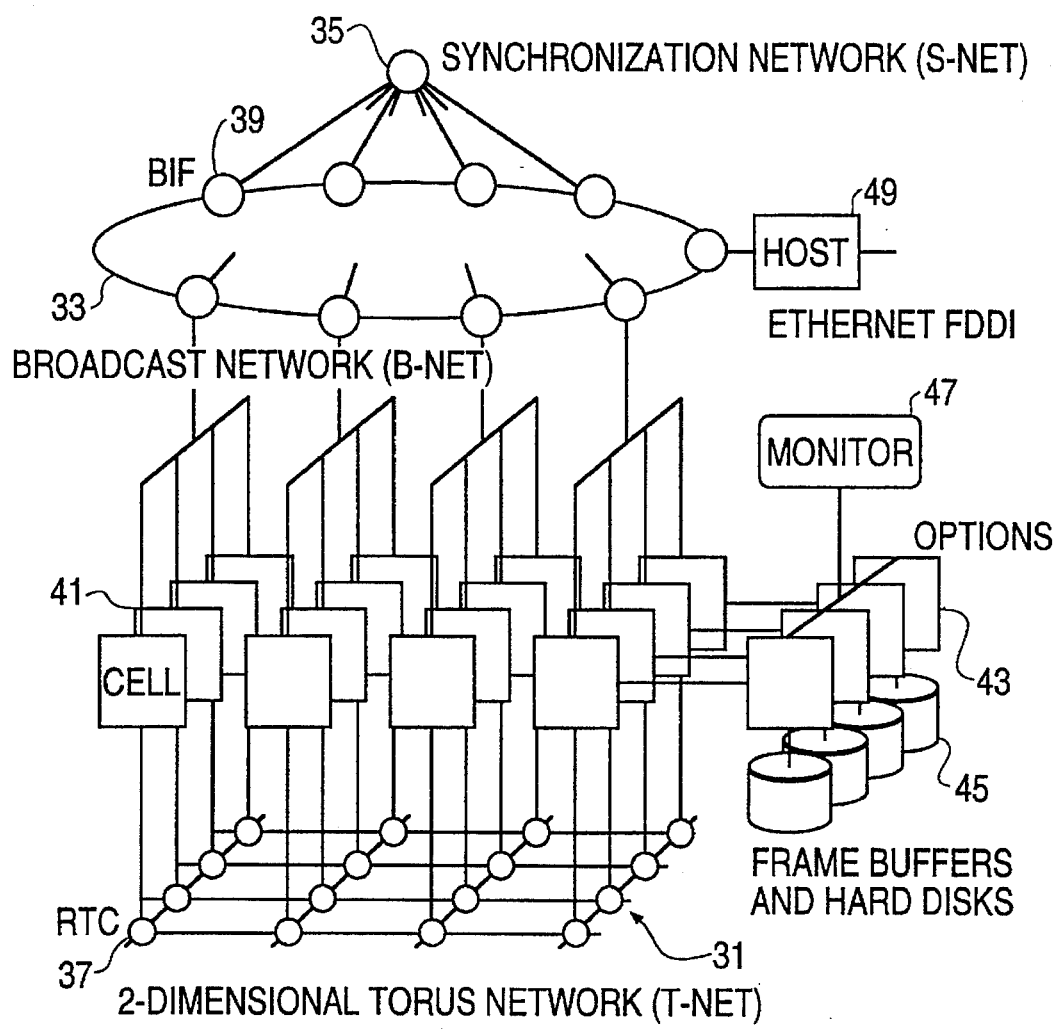
FIG. 2 is a schematic diagram of an architecture of a parallel computer used in an embodiment.

FIG. 2 is a schematic diagram of the architecture of AP1000.

AP1000 comprises three independent communication networks including a torus network (hereinafter referred to as a T-net) 31 for use in one-to-one communication, a broadcast network (hereinafter referred to as a B-net) 33 for use in one-to-multitude communication, and a synchronization network (hereinafter referred to as an S-net) 35 dedicated for barrier synchronization.

The T-net has a routing controller (RTC) 37 at each two-dimensional lattice point. The B-net has a plurality of broadcast network interfaces (BIF) 39. The RTCs 38 of the T-net and the BIFs 39 of the B-net are connected via buses in four-to-one correspondence. Each bus is provided with a cell processor (hereinafter simply called a cell) 41. As an optional arrangement, some of the cells are connected to frame buffers 43 and hard disks 45. The frame buffers 43 are connected to a monitor 47.

The BIFs 39 of the B-net are collectively connected to the S-net 35. One of the BIFs is connected to a host computer 49. As a result, all of the cells 41 and the host computer 49 are connected through the B-net.

The B-net comprises a combination of hierarchical buses and a ring and is used in broadcasting, scattering, and collection of data. During data transfer, the B-net is occupied by one cell or the host computer. In this connection, the host computer or the cell which wants to carry out data transfer produces a request for use of the B-net to acquire a use right, prior to data transfer. The B-net comprises a data bus of 32 bits and control signals such as a reset signal and an interruption signal. The B-net has a data transfer rate of 50 Mbyte/s under a pipelined handshaking control.

The T-net has a topology of a two-dimensional arrangement. Message relaying operation is automatically carried out by hardware by means of wormhole routing.

In the wormhole routing, a header of the message is used to construct a relay route from an input channel to an output channel for transmission of the messages. In store-and-forward routing, a relay processor stores the entire message. On the other hand, in the wormhole routing, the relay processor stores a so-called flit or data of several bytes (bits, 16 bits in AP1000) alone so that a reduced latency is realized.

As mentioned above, the wormhole routing advantageously has a reduced latency of communication. However, it suffers possibility of occurrence of deadlock and decrease of throughput since a communication channel is blocked by the message. The T-net of AP1000 avoids the occurrence of deadlock and suppresses the decrease of throughput by a combination of a structured buffer pool algorithm and the wormhole routing. In order to reduce the latency of broadcasting communication, row or column broadcasting function is simultaneously implemented. Each port of the T-net has a 16-bit wide data bus. The T-net has a data transfer rate of 25 Mbyte/s under a pipelined handshaking control like the B-net.

All cells and the host computer are connected also through the S-net. The S-net has a topology of a tree arrangement and is used for barrier synchronization and status detection. The data from each cell are transmitted towards a root of the S-net. At each node of the S-net, the data from the cells are merged by an AND operation. A theoretical product of the data produced from all cells is obtained at the root of the S-net. The arithmetic result thus obtained is sent back through the S-net along a reverse direction and informed to all cells. The time period required to obtain the arithmetic result of the data delivered from the cells to the S-net is constantly equal to eight clocks (640 ns) irrespective of the number of cells.

The host computer is implemented by a general purpose work station. A host interface of AP1000 comprises a VME bus interface board mounted in the host computer and a host interface board mounted in a frame of AP1000. A B-net interface and a local memory of 32 Mbytes are mounted on the host interface board and can be used as a message buffer.

Figure 3:
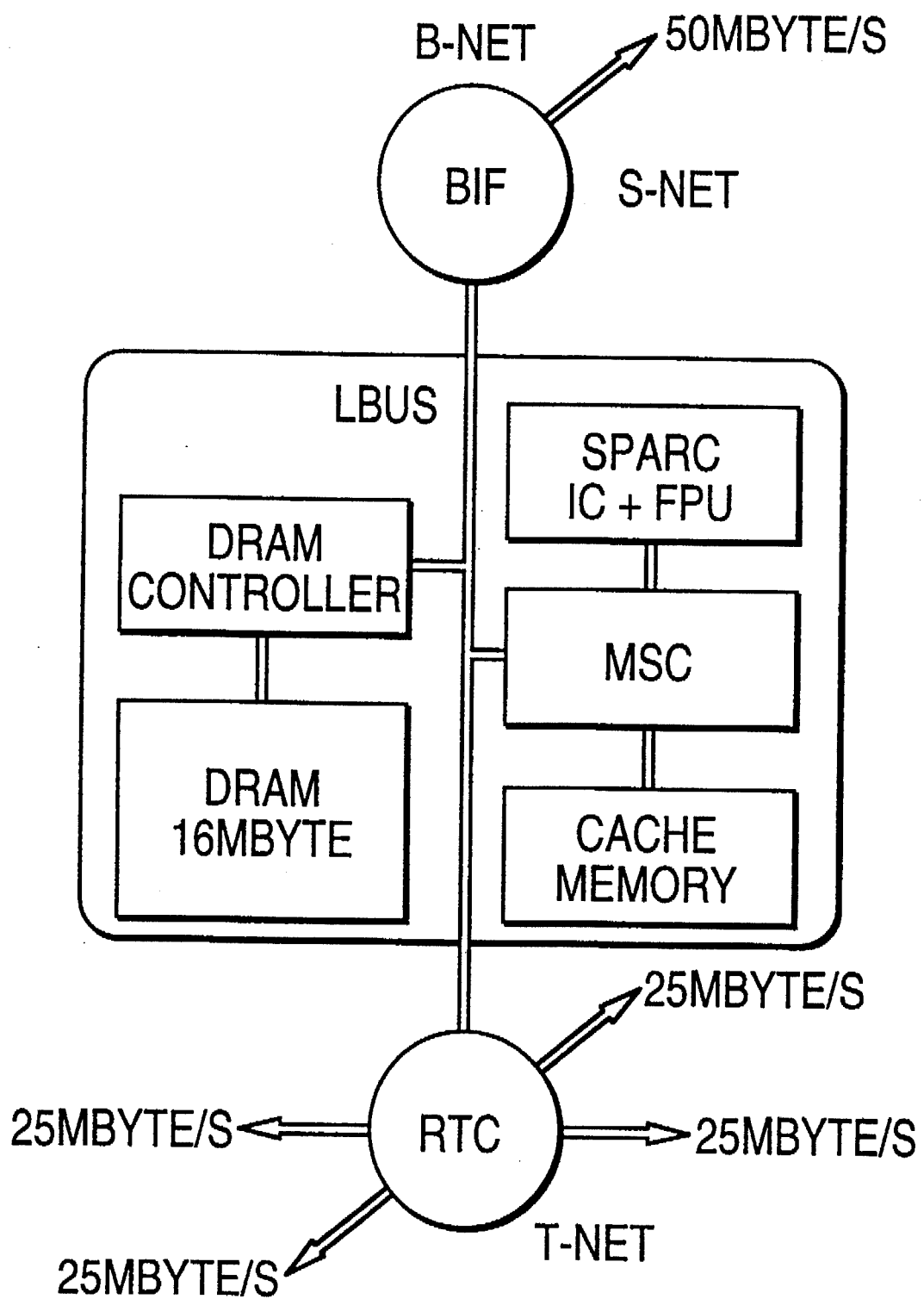
FIG. 3 shows a structure of a cell in the embodiment.

FIG. 3 shows a structure of the above-mentioned cell. Each cell comprises an integer calculation unit (IU) 51, a floating-point calculation unit 53 (FPU), a message controller 55 (MSC), a routing controller 57 (RTC), a B-net interface 59 (BIF), a main memory (DRAM) 61 of 16 Mbytes. The IU and the FPU are connected to a direct map cache memory 63 of 128 Kbytes and operable at 25 MHz. The IU has a SPARC architecture. The RTC is implemented with an automatic routing function on the two-dimensional torus network while the BIF is implemented with a data scattering/gathering function and a barrier synchronization function. The MSC, the RSC, the BIF, and a DRAM controller (DRAMC) 65 are connected through a 32-bit internal bus called LBUS. The LBUS in each cell is drawn out via a connector for connection with an optional hardware unit such as a high-speed I/O interface, an extended memory, a disk interface, and a vector processor.

The main memory comprises a DRAMC for controlling the DRAM in a quadrupole interleaving fashion, and a plurality of 4M-DRAMs, forty in number. The MSC comprises a cache controller, a pair of message handlers called a line sending unit and a buffer receiving unit, and a 4-channel high-performance DMA controller.

Figure 4:
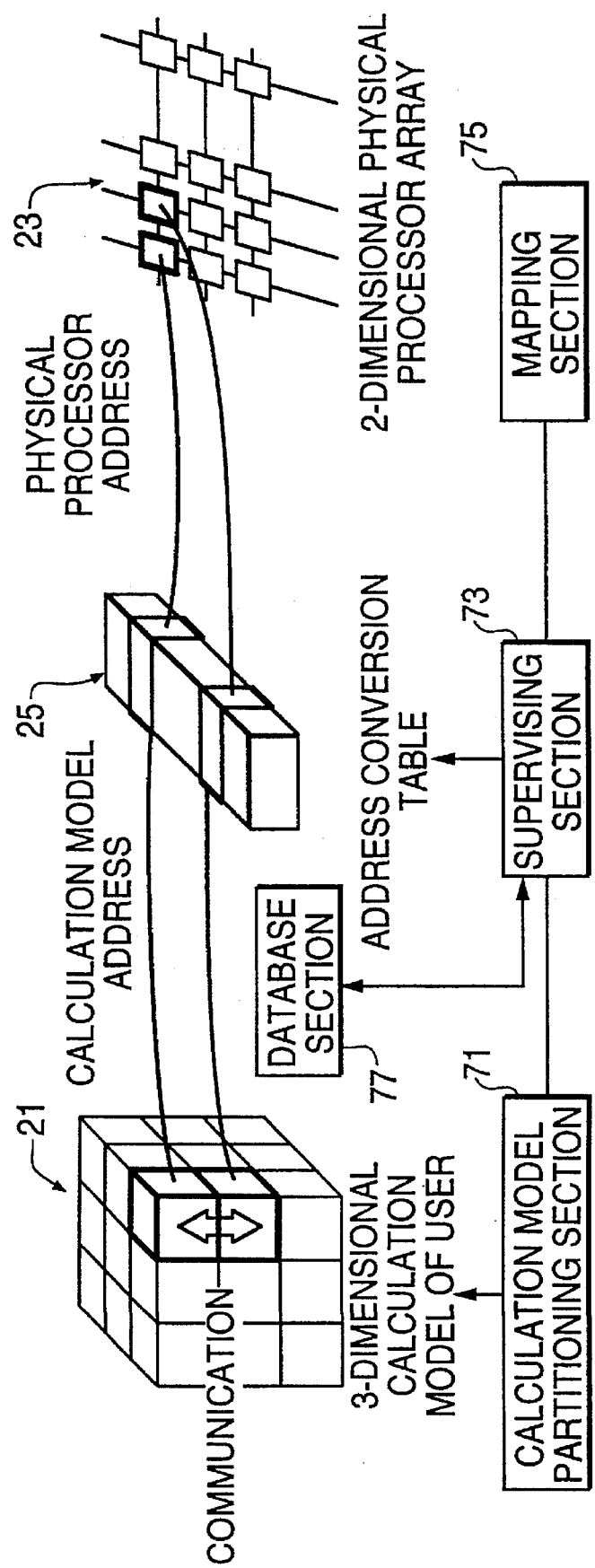
FIG. 4 a relationship between the interface and functional blocks according to this invention.

In this embodiment, the structure illustrated in FIG. 4 is realized on the above-described architecture. The structure comprises a calculation model dividing section 71 for dividing the above-mentioned N-dimensional calculation model into a plurality of calculation units having identification codes, a supervising section 73 for establishing on an address conversion table correspondence between the calculation units and a plurality of processors assigned with identification codes, and a mapping section for desiredly mapping the calculation units into the processors. The optimum mapping information obtained at the mapping section 75 is delivered to a database section 77. The database section 77 is formed on the hard disk 45 illustrated in FIG. 2. Thereafter, reference is made to the database unit 77 through the supervising unit 73 to establish the address conversion table so that parallel calculation is carried out.

Significance of the user space and necessity of free mapping by the user from the user space have been described in the foregoing. The interface which meets such a demand is realized on the AP1000.

Figure 5:
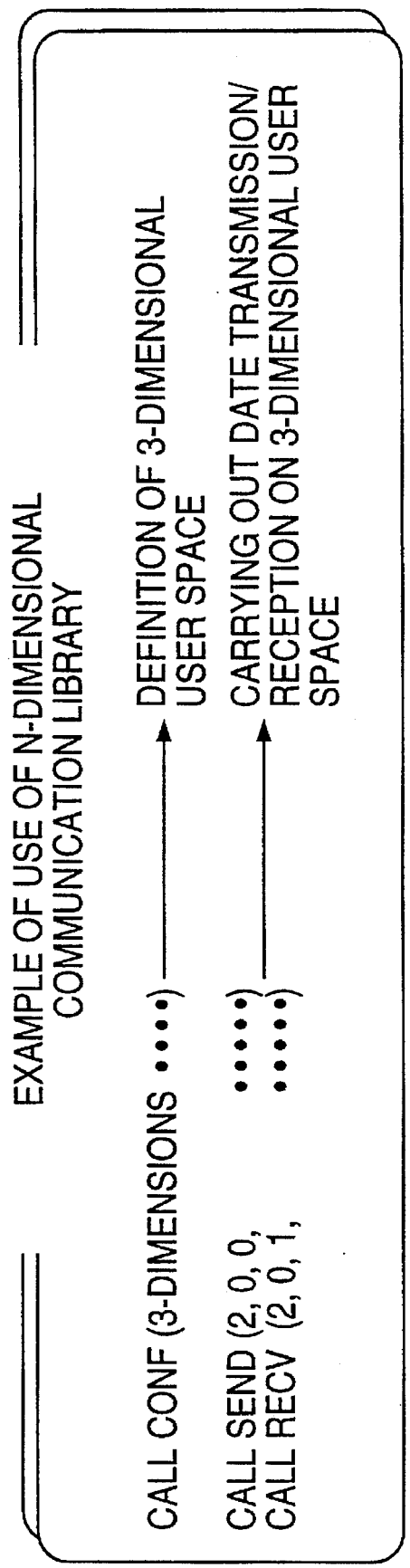
FIG. 5 shows a part of a library program.

An outline of realizing the interface will presently be described. As illustrated in FIG. 4, the calculation units of the N-dimensional calculation model divisioned by the user and the physical processors are assigned with the identification codes. The correspondence therebetween is held on the address conversion table. Simply by accessing the address conversion table, the user can freely perform a mapping operation. Thereafter, interprocessor communication is carried out by the use of the identification codes assigned to the calculation units. Thus, a work in the user space is realized so that the mapping operation is freely performed in correspondence to the N-dimensional calculation model. The above-mentioned routine is added to a conventional library group to realize an N-dimensional subroutine library as illustrated in FIG. 5.

More specifically, a user interface is established by the step of declaring the number of the processors used, the step of dividing the calculation model into the calculation units equal in number to Nn which is not greater than the number of the processors declared, the step of assigning the identification codes to the calculation units, the step of assigning the identification codes to the processors used, and the step of registering in the supervising table correspondence between the identification codes assigned to the calculation units and the identification codes assigned to the processors.

The identification codes assigned to the calculation units and the processors are preferably serial numbers such as 1, 2, 3, . . . for convenience of supervision.

<Flow of Processing>

Figure 6:
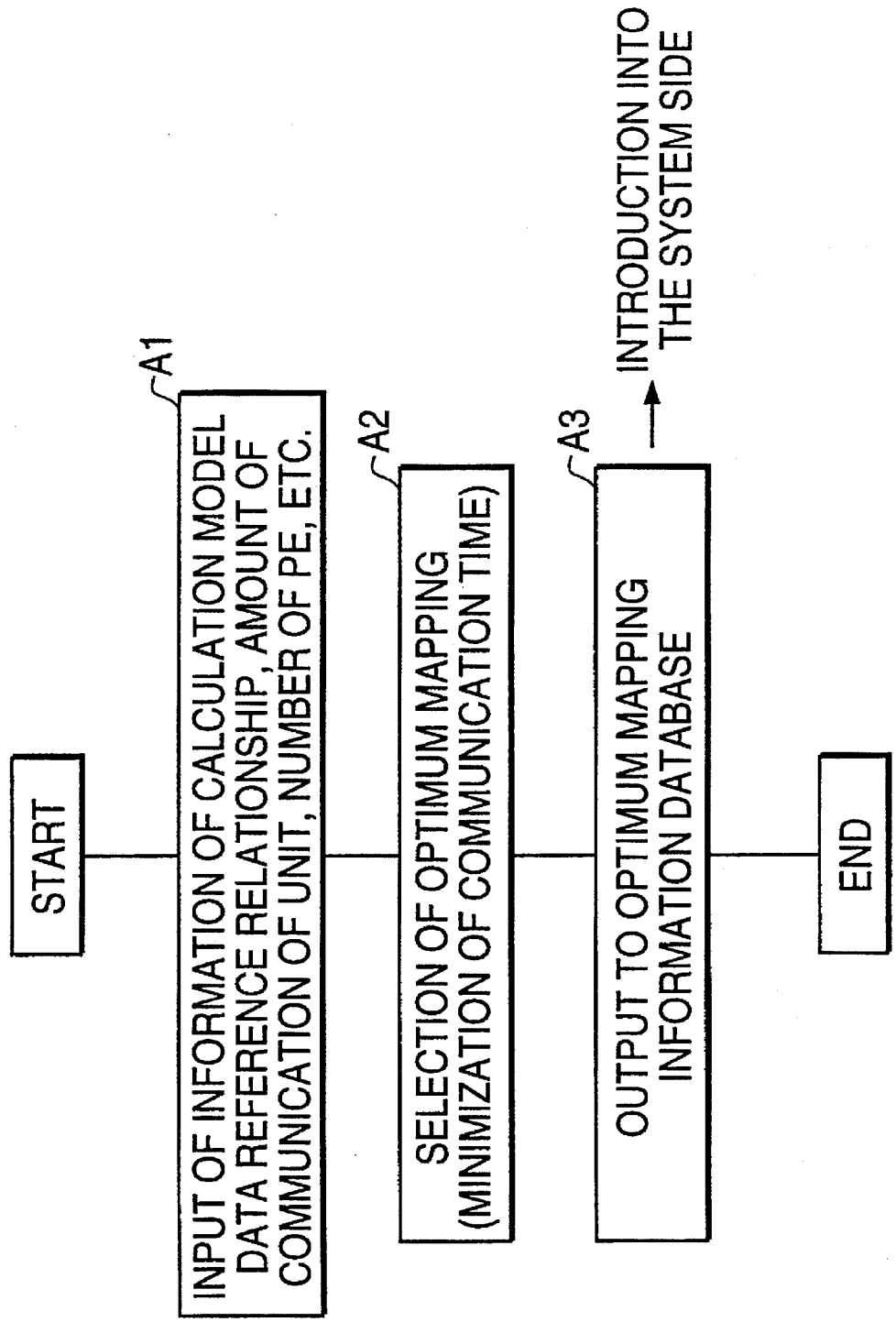
FIG. 6 is a flow chart of processing in this embodiment.

In order to perform the optimum mapping, it is necessary to input the information about the calculation model as illustrated in FIG. 6. Specifically, the data reference relationship (also referred to as the data reference pattern), the interprocessor data amount per calculation unit, and the number of the processors are defined (Step A1).

Next, the optimum mapping is obtained by the use of a mapping optimization technique (Step A2). The mapping optimization technique will later be described.

The mapping information thus obtained is delivered to the database (Step A3).

<Use in Application Program>

Once the database is established, the following process is carried out upon parallel processing of the calculation model in the application program or the like.

Figure 7:
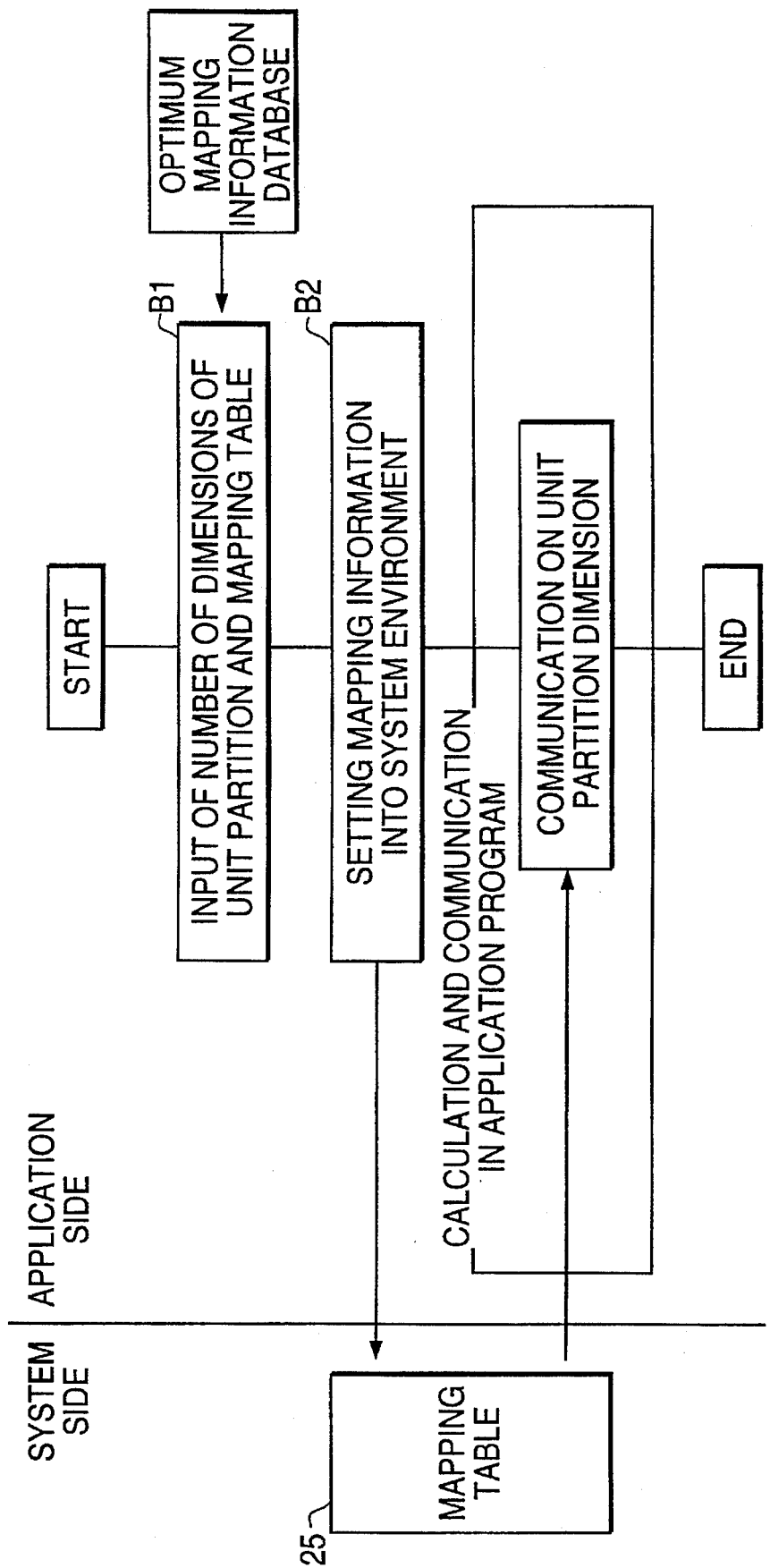
FIG. 7 is a flow chart for describing the use of a database obtained.

As illustrated in FIG. 7, the number of dimensions of division and a mapping table are at first inputted (Step B1). It is noted here that the input of the mapping table is the establishment of the user interface described above.

Next, the optimum mapping information database is accessed to read the optimum mapping information adapted to the calculation model to be calculated. The optimum mapping information is set in the system environment (Step B2). Herein, the mapping table is established on the address conversion table 25 in FIG. 4.

After this process is completed, parallel processing is carried out while communication is performed on the unit division dimensions.

<Mapping corresponding to Calculation Model>

Now, description will proceed to a method of obtaining the optimum mapping.

Figure 8:
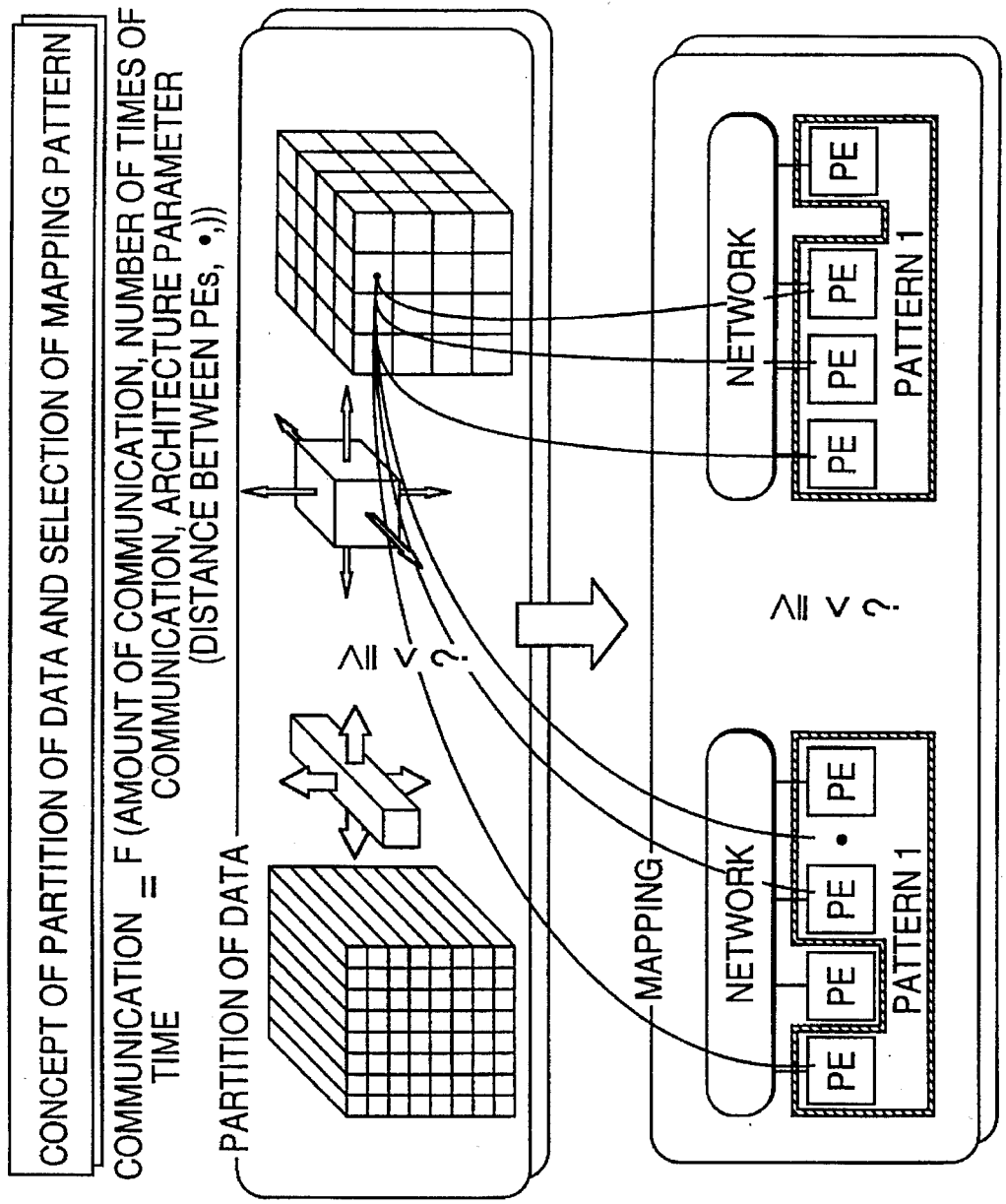
FIG. 8 shows a concept of data division and selection of mapping pattern.
Figure 9:
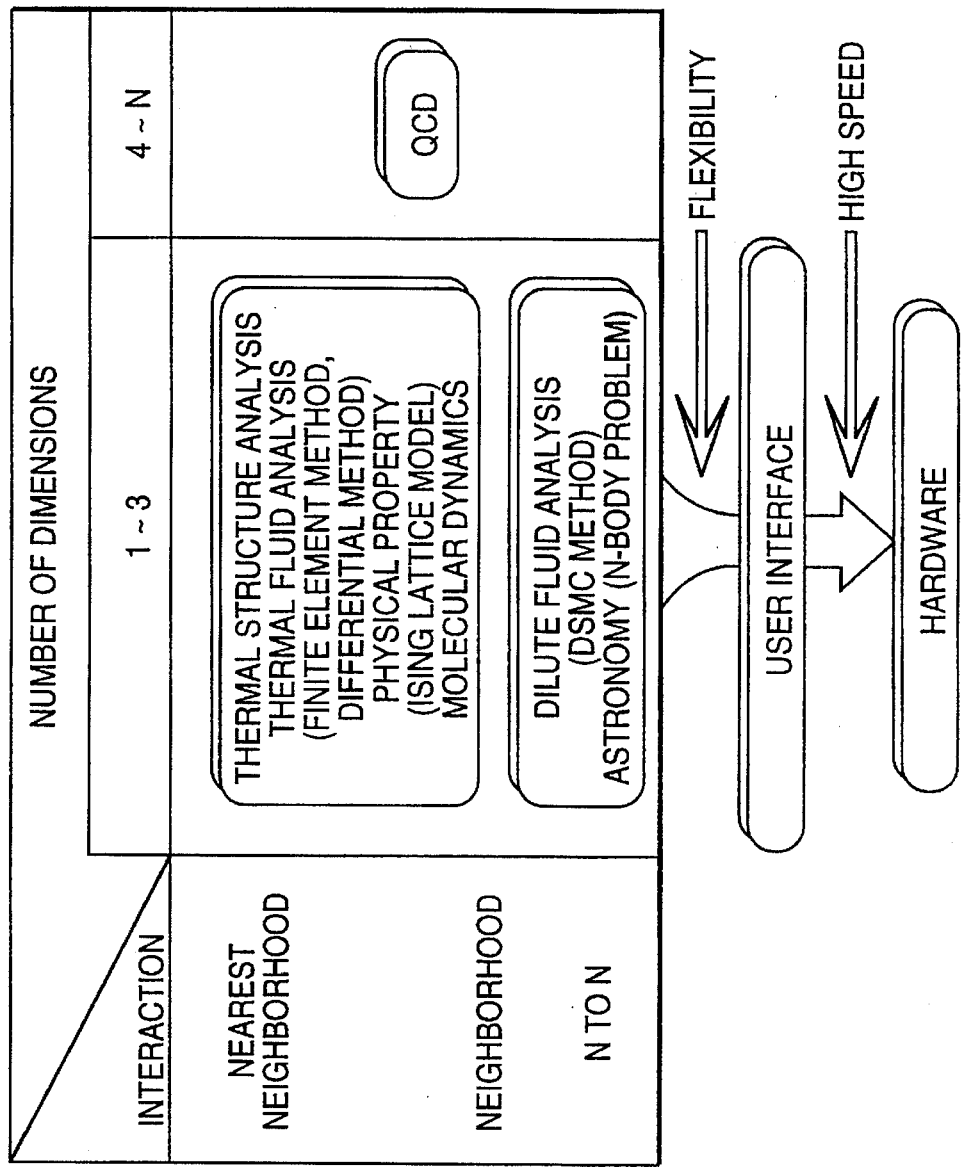
FIG. 9 shows a relationship between data reference patterns and the number of dimensions of division.

As illustrated in FIG. 8, mapping is a process of assigning the data to the processors after the data are divided in any N dimensions. FIG. 9 shows the problems to be considered, for example, whether division is to be made in two dimensions or three dimensions, whether the pattern 1 or the pattern 2 is selected as a mapping pattern, and so on.

Upon mapping, the data reference pattern, the number of dimensions of the calculation model, and the evaluation function of the communication cost should be considered.

"Data Reference Pattern"

Taking into consideration the data reference pattern and the balance between communication and calculation, the manner of division is determined.

As a prerequisite for mapping, data division is taken into account. The matter to be considered is the pattern of communication among the calculation units as a result of division, and the balance between the amount of calculation in a particular unit and the amount of communication between the particular unit and other units.

Figure 10:
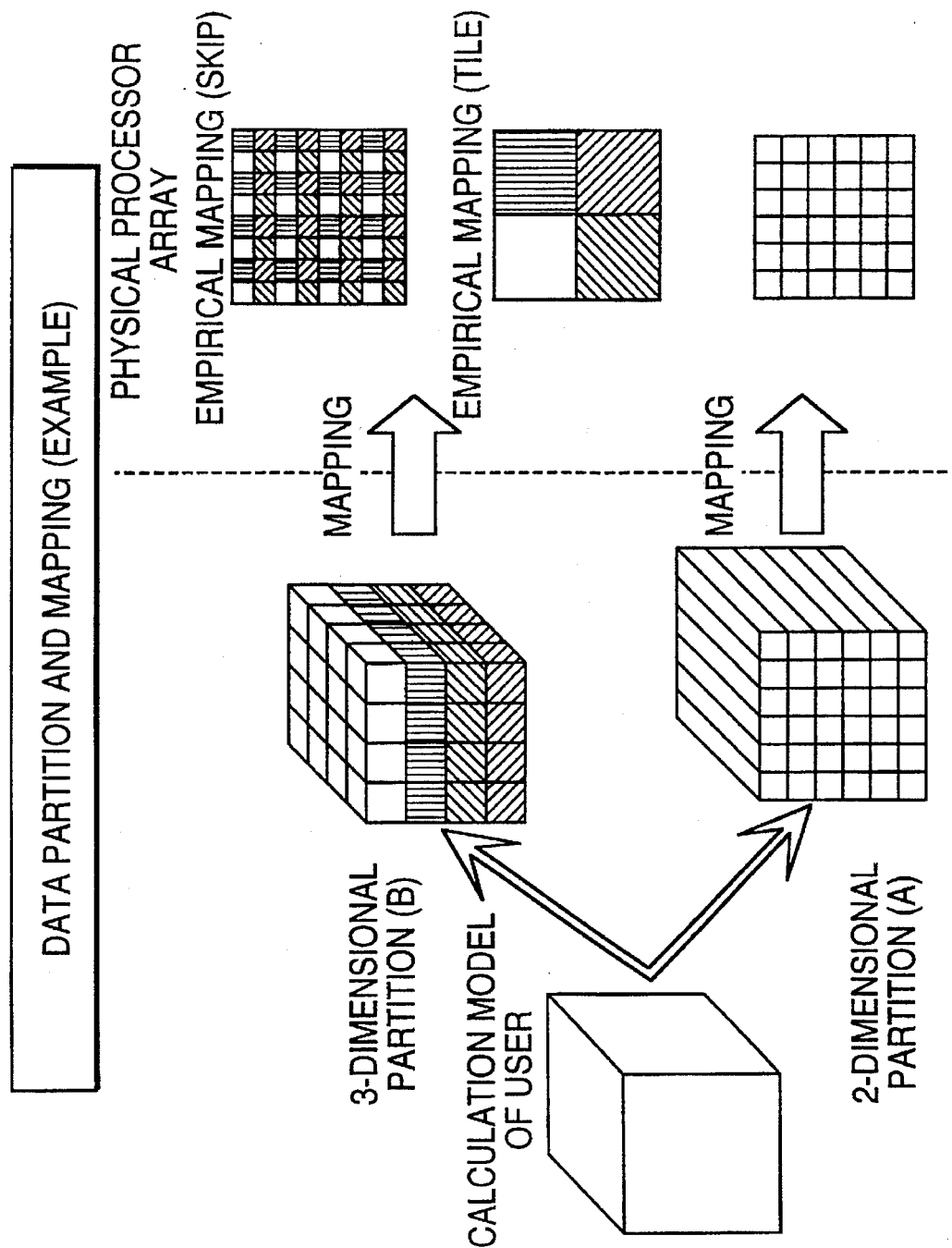
FIG. 10 shows an example of a relationship between data division an mapping.
Figure 11:
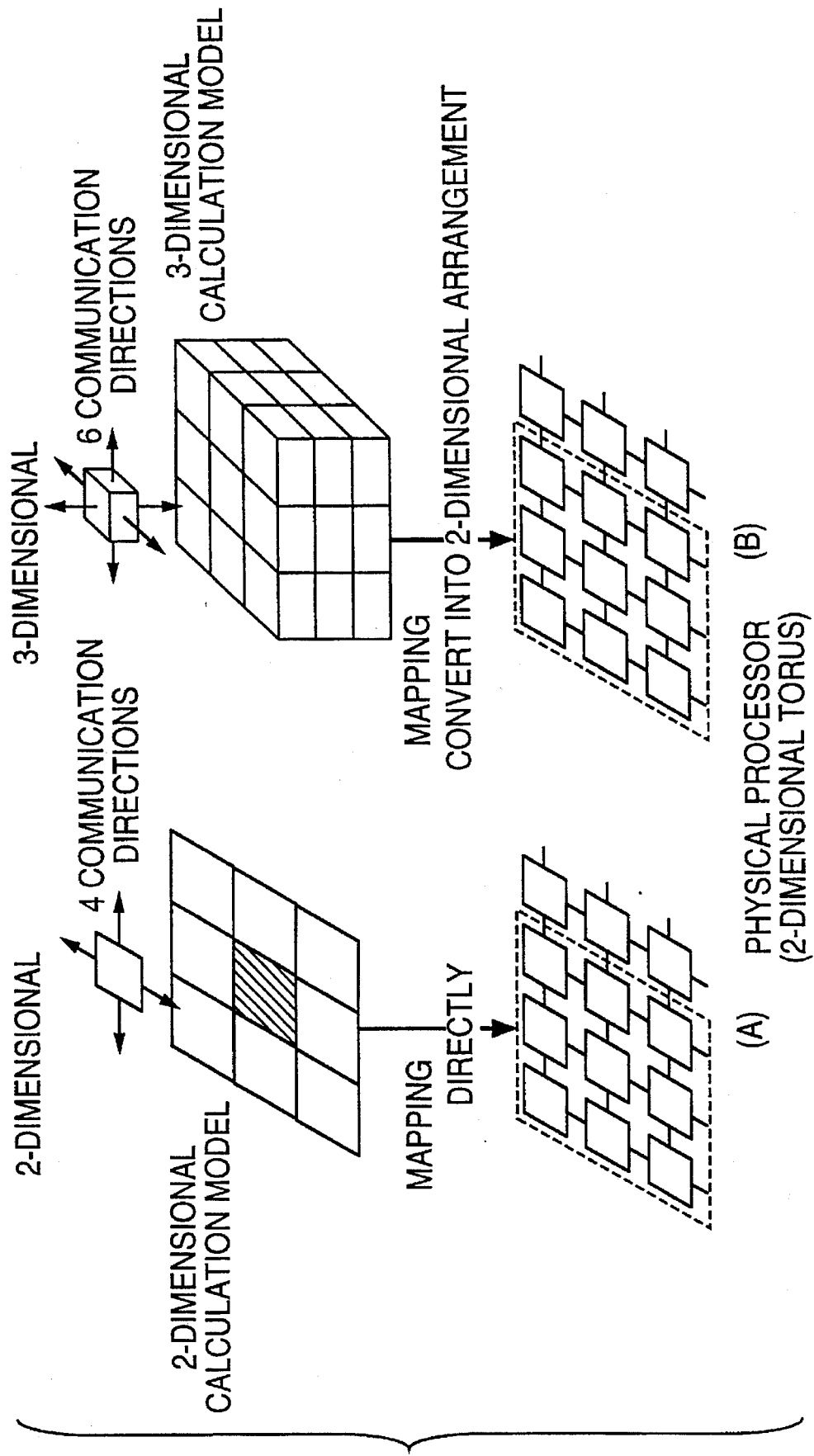
FIG. 11 shows another example of the relationship between data division and mapping.

For example, consideration will be made as regards a case where a cubic lattice model of a particular lattice size is divided and assigned to each cell (processor). It is assumed that the data reference pattern is "nearest neighborhood" (reference is made to six directions including ±X, ±Y, and ±Z). Since AP1000 has a two-dimensional torus arrangement, division is carried out as illustrated in FIG. 10(a) taking the simplicity of mapping into consideration. It is called two-dimensional division. However, such division is disadvantageous. Specifically, the two-dimensional division results in four communication directions as illustrated in FIG. 11(A). In the cubic model, the surface area and the volume represent the amount of communication and the amount of calculation, respectively. With an increase of the number of division, namely, with an increase of the number of cells (processors), a ratio of the amount of communication to the amount of calculation is increased.

In view of the above, proposal is made of a division mode illustrated in FIG. 10(B). It is called three-dimensional division. As illustrated in FIG. 11(B), the three-dimensional division results in six communication directions so as to deal with the data reference pattern of "nearest neighborhood". Accordingly, the ratio of the amount of communication is favorably reduced as compared with the two-dimensional division. However, mapping is difficult to perform.

Summarizing, in order to reduce the ratio of the amount of communication in a unit communication direction against the amount of calculation, the mode of division is selected with reference to the communication pattern resulting from the division and the simplicity of mapping.

In the meanwhile, different data reference patterns are adopted in various application programs. It is therefore impossible to preliminarily consider all possible cases. In this connection, classification is made by the data reference patterns frequently appearing in the applications programs, as illustrated in FIG. 9.

(1) Nearest Neighborhood Lattice: Reference to the data required for renewal of the own data should be made from the lattice points of the nearest neighborhood. Reference is made in the six directions of ±X, ±Y, and ±Z.

For example, this data reference pattern is applicable in a structural analysis, a thermal conduction fluid analysis (a finite-element method, a center difference method), physical property (Ising spin), and MD (molecular dynamics).

(2) Neighborhood Lattice: Reference to the data required for renewal of the own data should be made from the lattice points of neighborhood (including the nearest ones and those in oblique directions). Reference is made in the twelve directions of ±X, ±Y, ±Z, ±ZX ±YZ and ±XY.

For example, this data reference pattern is applicable in QCD (Quantum Chromodynamics).

(3) N to N: For renewal of the data, reference should be made to all lattice points.

For example, this data reference pattern is applicable in tracking of particles in dilute fluid. In order to track the particles in dilute fluid, all divided areas must be referred to. This is because which areas the particles go to is indefinite.

(4) Complete independence: No communication. In this case, calculation is independently carried out in each processor (PE) of the parallel computer.

FIG. 9 shows the relationship between the above-mentioned cases and the number of dimensions for division. Description will be made in conjunction with the three-dimensional division by way of example to clarify the influence of the different data reference patterns described above.

Nearest Neighborhood:

By the three-dimensional division, communication is caused to occur in six directions in each unit. They are mapped into two-dimensional cells (processors). However, only four communication paths are present in each two-dimensional cell. In AP1000, a communication time is not dependent upon the distance between cells in principle. However, in order to avoid conflict of messages, it is desirable to arrange the units supposed to communicate with each other as near as possible. To this end, the units in four directions can be adjacently arranged. It is a problem how to deal with the remaining two directions.

Neighborhood (including oblique directions also):

In this case, the directions required by the unit for calculation are increased. Mapping is affected correspondingly.

N to N:

In this case, reference must be made to all calculation units in order to perform renewal of data. It is necessary to take this into consideration. In this event, an enormous amount of communication is caused by the division. Accordingly, it is necessary to introduce another concept of mapping different from the concept of neighborhood.

"Number of Dimensions of the Calculation Model and Mapping"

Reference to the data is made in different concepts in dependence upon the number of the dimensions of the problem. Description will be made in conjunction with FIGS. 10 and 11. In case when the two-dimensional calculation model having the data reference pattern of nearest neighborhood is mapped into the two-dimensional torus network such as AP1000, mapping is directly carried out. In case of the three-dimensional calculation model, conversion is necessary in an intermediate stage. With an increase in number of the dimensions of the calculation model, each calculation unit has an increased number of the communication directions. It is presumed that mapping becomes more difficult to perform with an increase in number of the dimensions of the calculation model. For example, six communication directions are present in case of the three-dimensional model having the data reference pattern of the nearest neighborhood lattice while eight communication directions are present in case of the four-dimensional model. In order to map them into two dimensions, parts or units corresponding to the remaining directions must be arranged somewhere.

In the embodiment, optimization of communication will be considered in conjunction with the case of the three-dimensional model having the data reference pattern of the nearest neighborhood lattice in AP1000 (two-dimensional torus arrangement). This case is most widely used in the application programs.

"Evaluation Function of Communication Cost"

Figure 12:
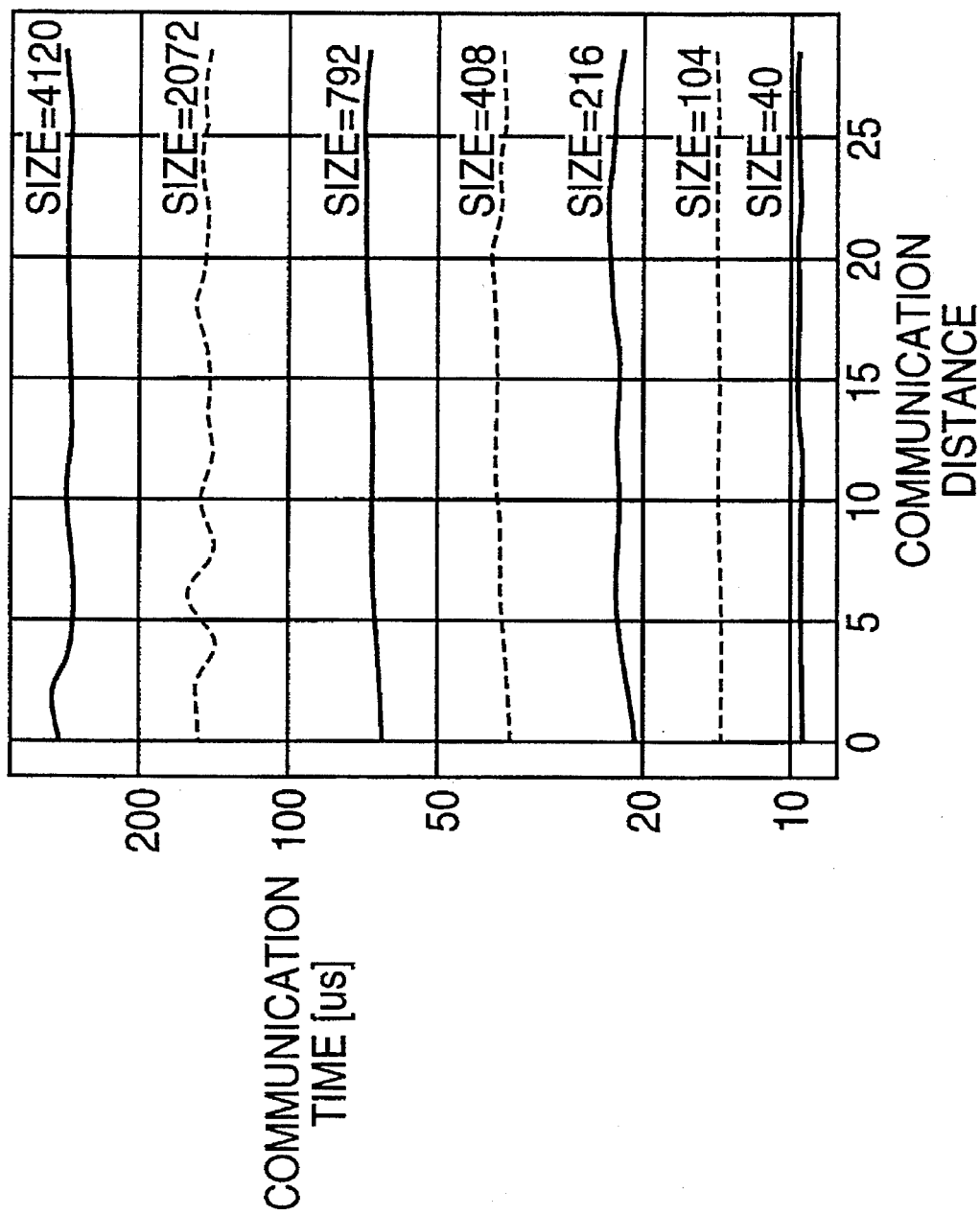
FIG. 12 shows a distance between PEs versus a communication time AP1000.
Figure 13:
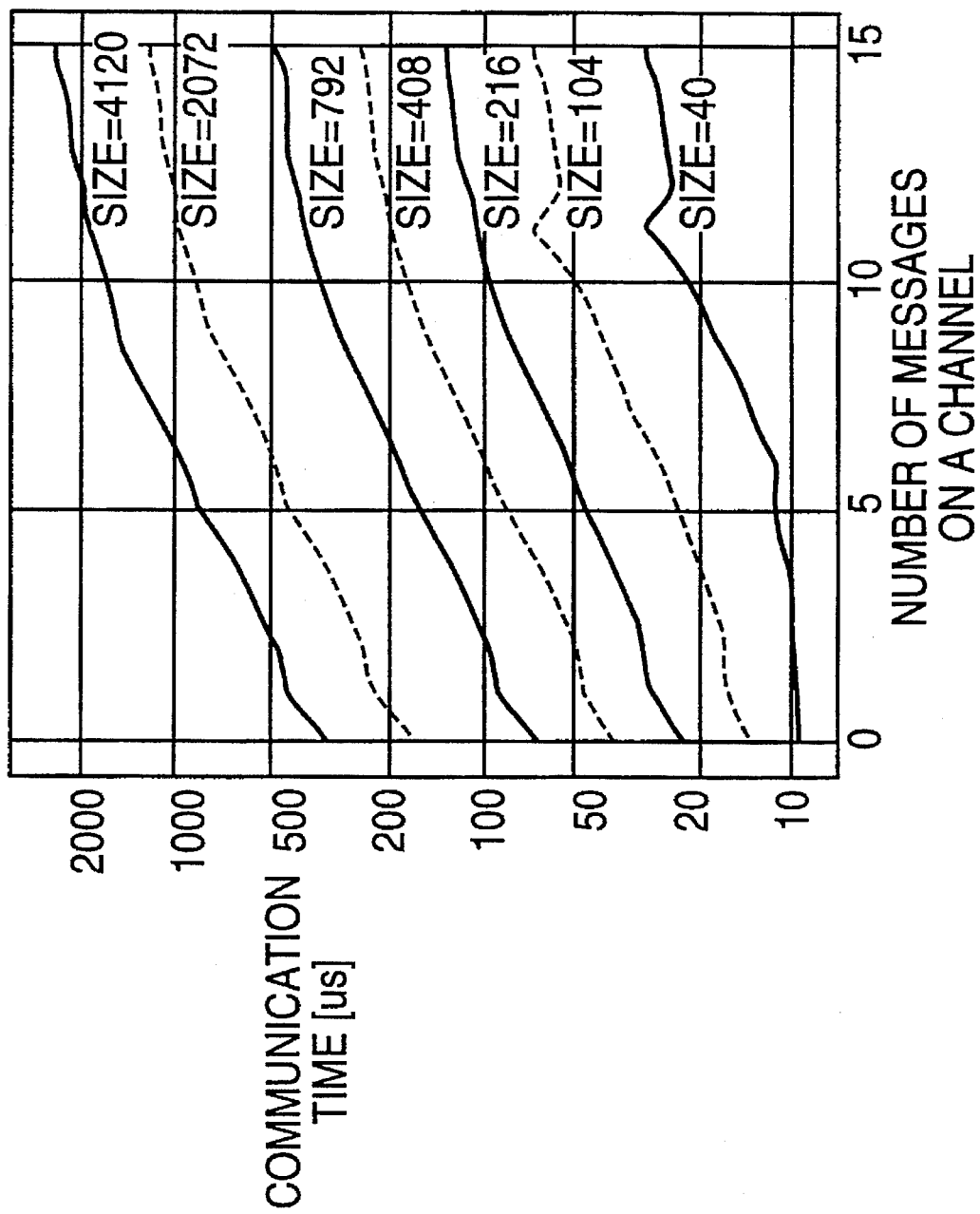
FIG. 13 shows communication contention versus a communication time AP1000.

Generally, in order to reduce the communication cost (time) in the parallel computer, consideration must be made of the number of times of communication, the amount of communication, the density of communication, and the interprocessor (PE) distance. The ratio of the influences of these factors upon the communication cost greatly depends upon the architecture of the parallel computer. In case of AP1000, the cost of interprocessor communication does not depend much upon the distance between the processors (PE) but greatly depends upon the density of communication, as illustrated in FIGS. 12 and 13.

It is presumed that, when the density of communication increases, the communication distance as short as possible will be effective in avoiding conflict of communication and in reducing the density of communication so that the communication cost is substantially minimized.

Figure 14:
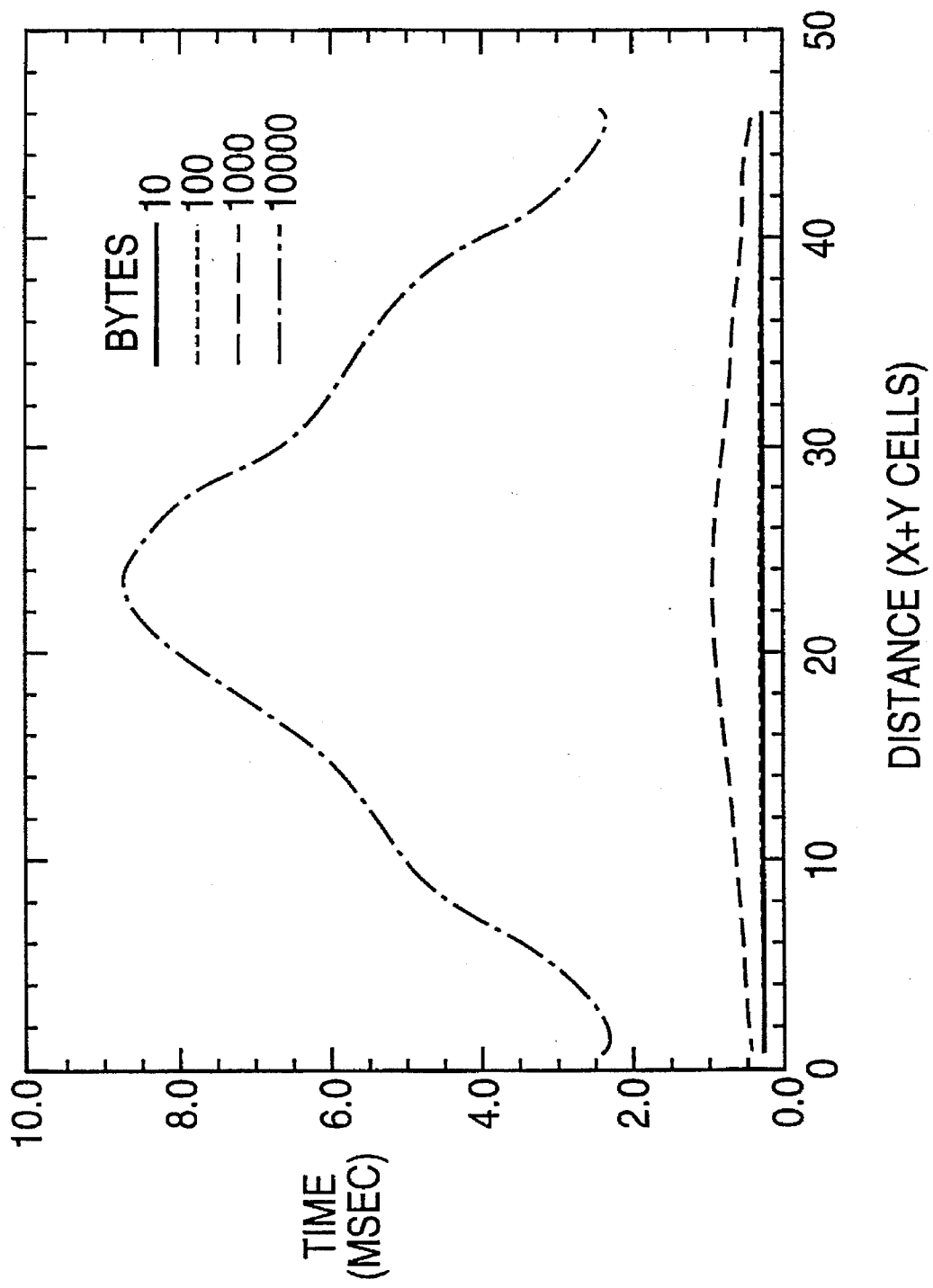
FIG. 14 shows a relationship between a distance and a time in AP1000.
Figure 15:
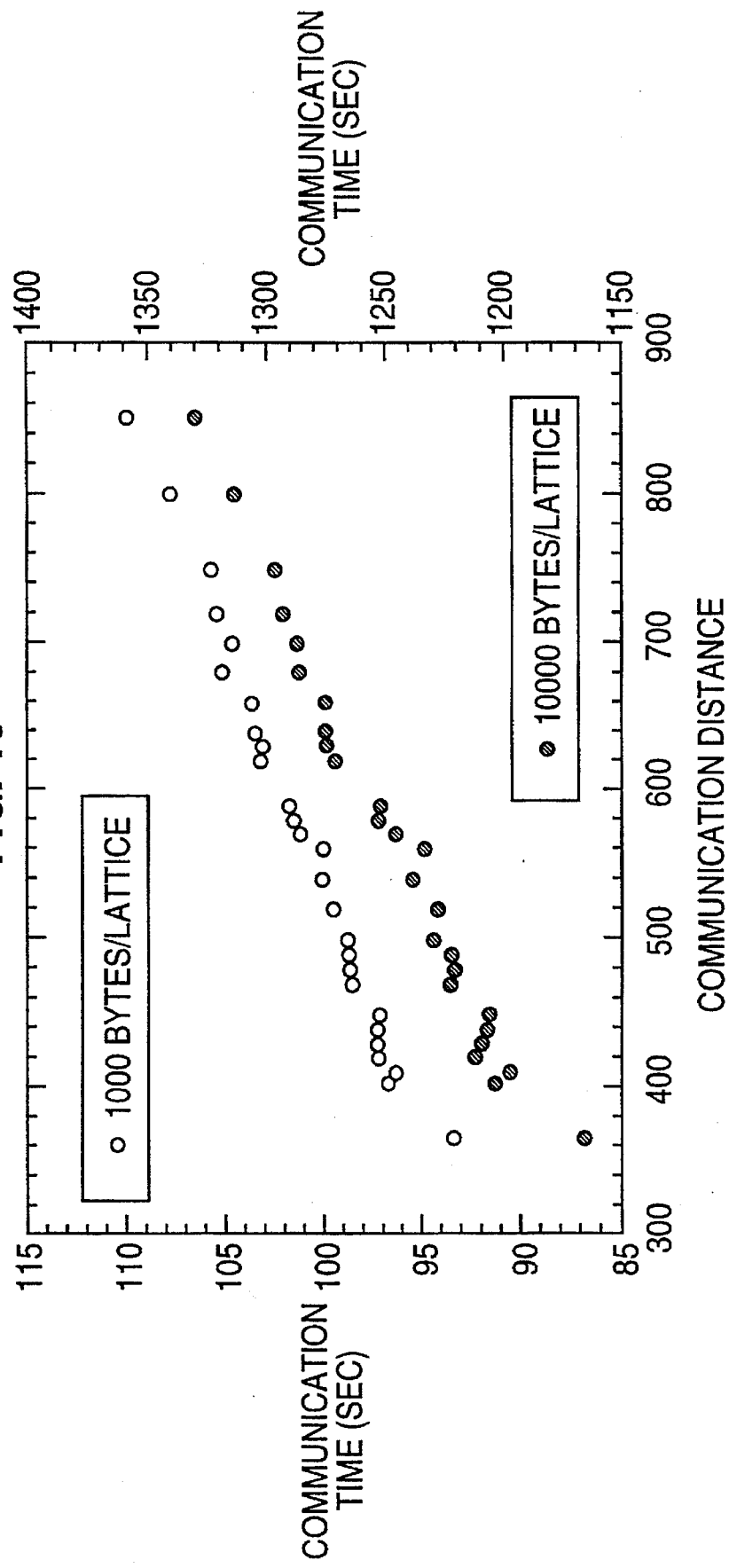
FIG. 15 shows a relationship between a total sum of communication distances and a communication time in AP1000.

This is also deduced from the network characteristic of AP1000 in FIG. 14. The experiment in FIG. 14 is to examine how long it takes from transmission to reception of the message in case when all cells simultaneously transmit to the cells spaced apart in the same direction by the same distance (not being message exchange). It is 32×16 cells. By the effect of the torus, the maximum transmission distance (X, Y) is equal to 24 as is obvious from the figure. It seems from this result that the communication time is linearly increased with respect to the distance when the data have a large volume and message drag occurs in the path. In order to confirm the above, a total sum L of the distances between the processors is introduced as an evaluation function. Mapping is carried out so that the total sum L of the distances has a minimum value. Examining the relationship between the total sum of the distances and the communication rate, it has been found out that the communication rate is increased as the total sum of the distances is decreased, as shown in FIG. 15.

In the embodiment, consideration is made of an example where a physical system of $3^3$ is mapped into a computer of a two-dimensional network architecture of $8^2$ and another example where $4^3$ is mapped into $8^2$ The number of combinations is equal to 10[48] and 10[90], respectively. Accordingly, it is impossible to examine all of these cases. In this connection, use is made of a method of empirically obtaining a regular arrangement and another method using simulation.

*Empirical Mapping

It is difficult to achieve the uniform communication cost for all of the six communication directions. At first, a particular direction is given priority and arranged adjacent. The remaining directions are arranged as near as possible and regularly.

Consideration is made of a model spatially divided in the directions X, Y, and Z for mapping.

Figure 16:
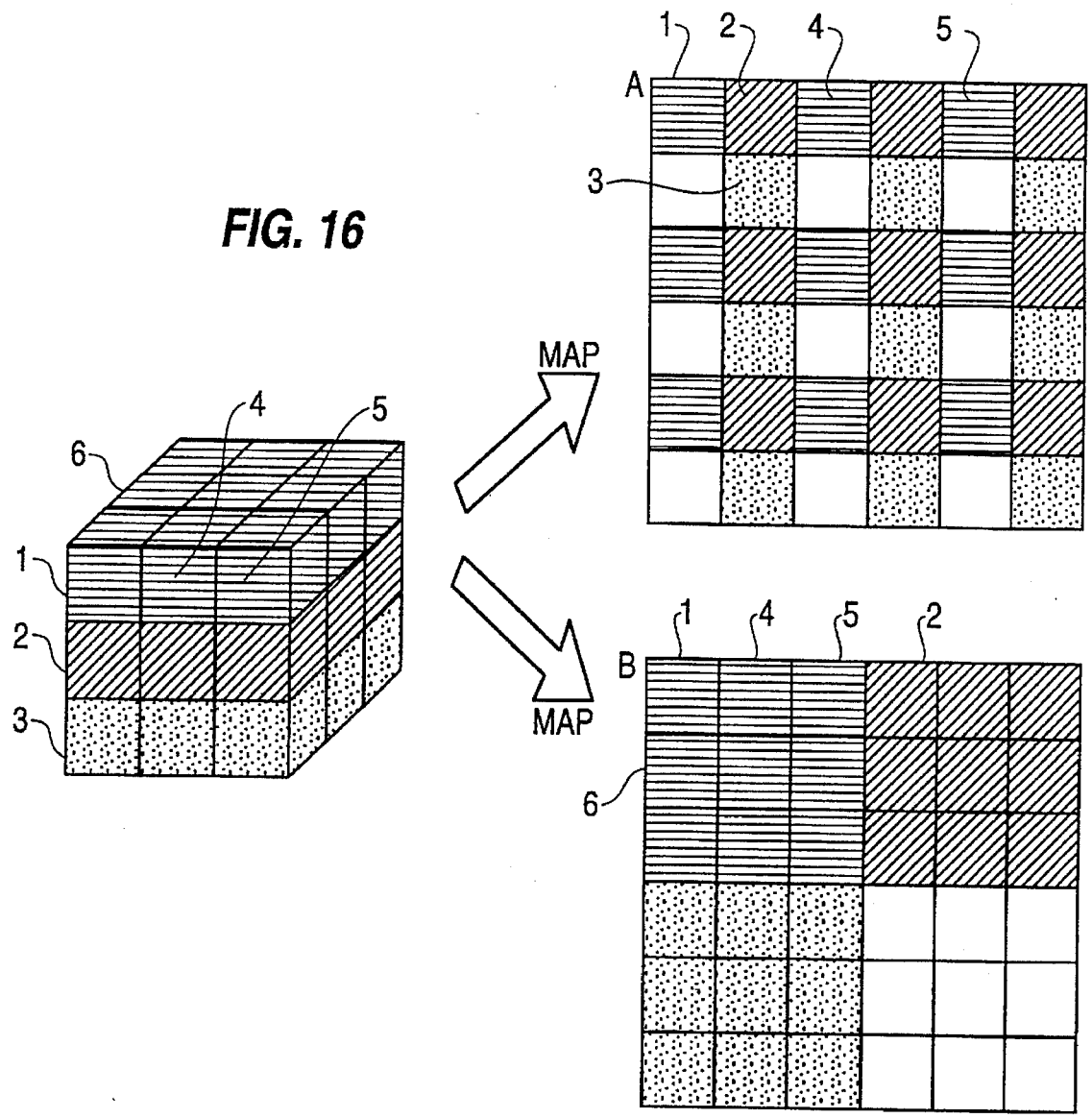
FIG. 16 shows a case where $3^3$ is mapped into $6^2$.

FIG. 16 shows a case where $3^3$ is mapped into $6^2$. FIG. 7 shows a case where $4^3$ is mapped into $8^2$ Referring to FIGS. 16 and 17, according to the mapping method A (referred to as a skip method), the model is divided by a ZX plane into four and the calculation units in the direction Y are arranged adjacent to one another in square. The communication in the directions Z and X are arranged at every second positions. However, in order to arrange the direction Y adjacent, the ZX plane must be divided into four.

More specifically, (a) in a three-dimensional calculation model, calculation units in directions X, Y, and Z are defined as VCX, VCY, and VCZ, respectively, while the numbers of division in the directions X, Y, and Z are defined as VX, VY, and VZ, respectively. At the same time, in a two-dimensional physical processor array to be subjected to mapping, the numbers of the X-directional physical processors and the Y-directional physical processors are defined as PCX and PCY, respectively. The numbers of division in the directions X and Y are defined as PX and PY, respectively. Thus, the physical processors are divided into groups.

(b) The three-dimensional calculation model is divided by VX=PCX/2, VY=PCY/2, and YZ=0 to form rectangular units called main units. Each main unit is assigned with a serial number (main unit number). The main unit is further divided into four In the direction Z to form the resultant units called subunits. Each subunit is assigned with a serial number (subunit number). Simultaneously, in the two-dimensional physical processor array, the processors are divided by PX=PCX/2 and PY=PCY/2 into groups. Each group is assigned with a serial number (group number).

Figure 18:
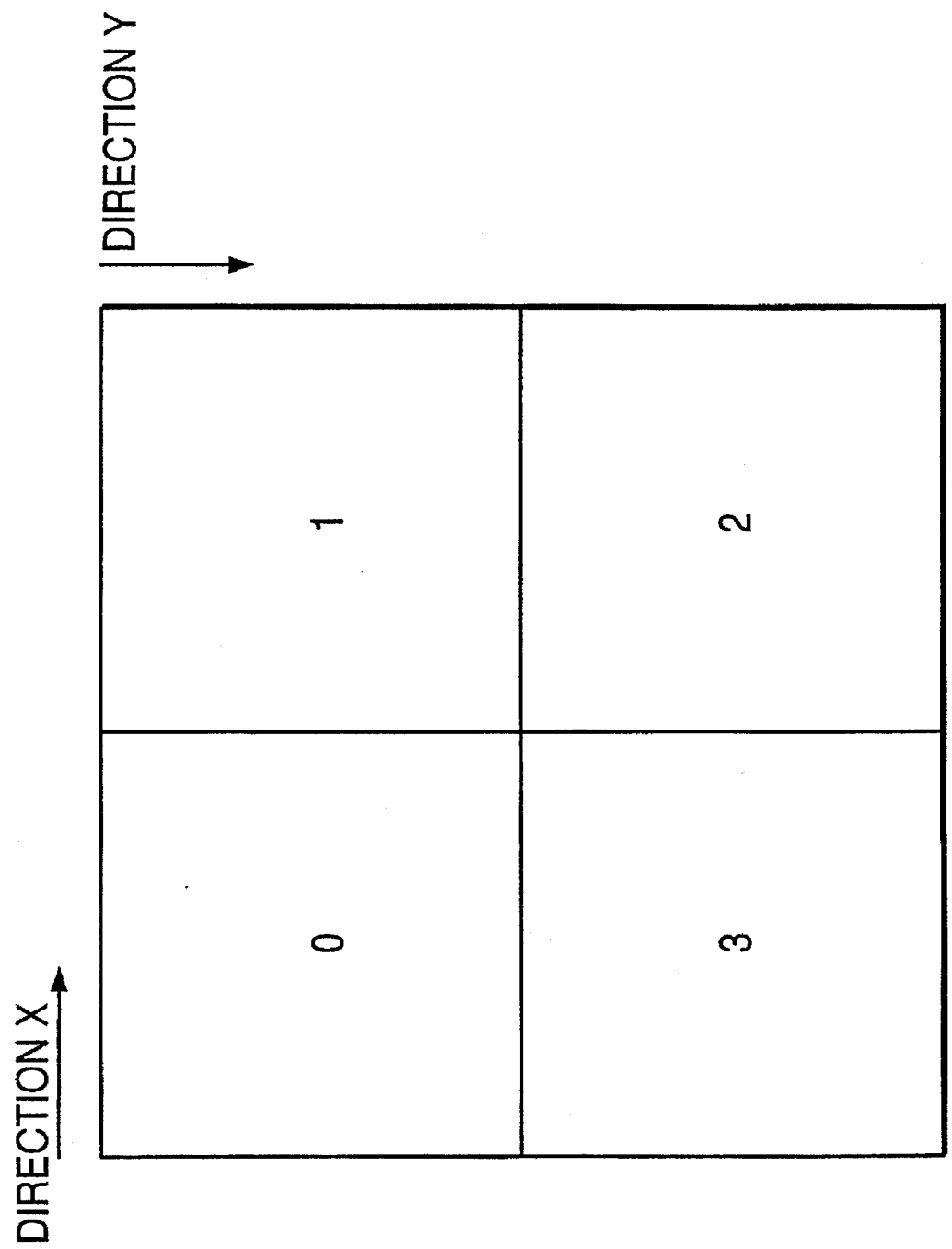
FIG. 18 shows an example of a mapping operation.

(c) Furthermore, subunit numbers 0 to 3 are scattered and mapped into the group of the physical processors having a group number similar to the main unit number of the three-dimensional model so that 0 and 1, 1 and 2, 2 and 3, 3 and 0 are respectively adjacent, as shown in FIG. 18.

Figure 17:
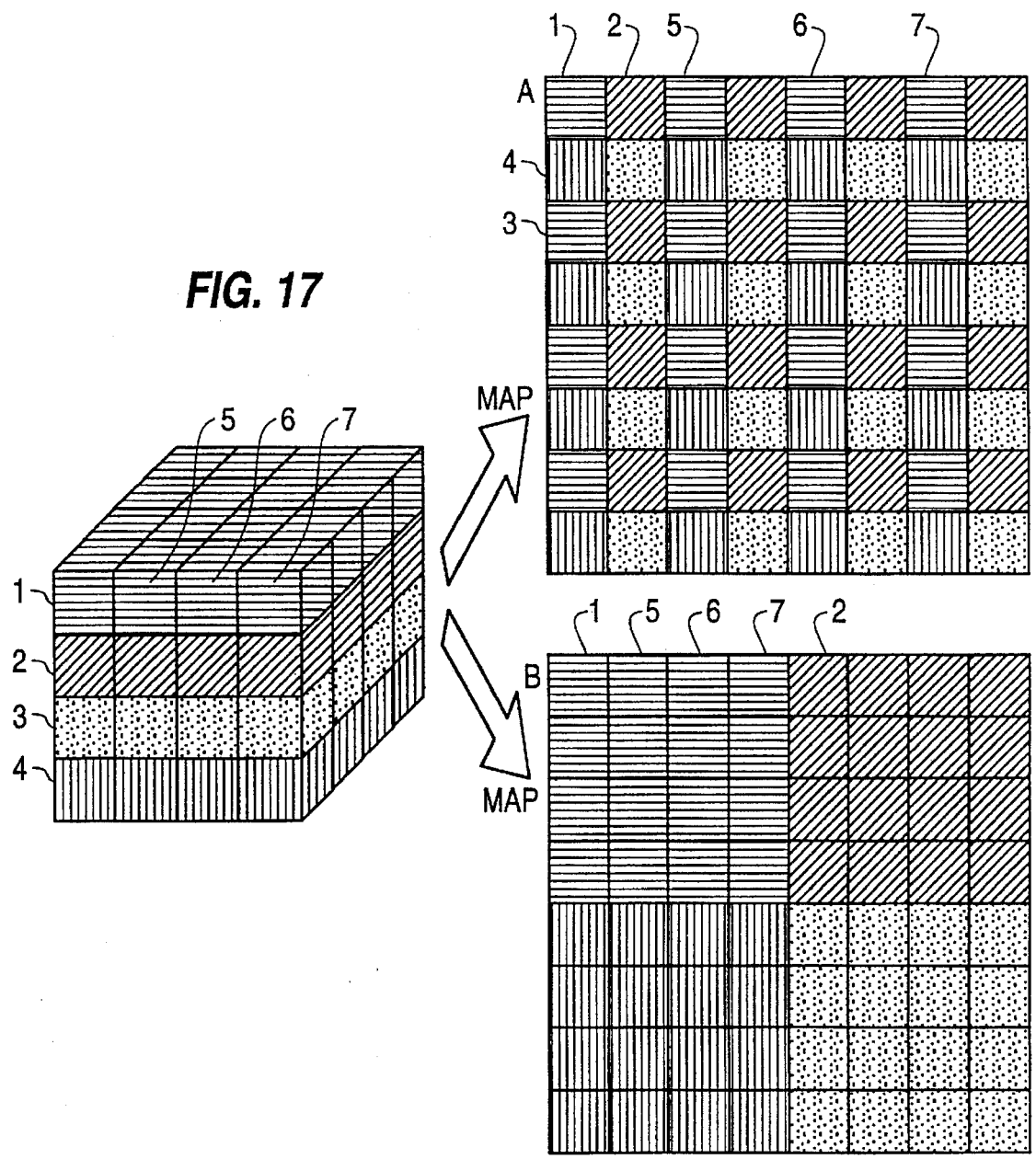
FIG. 17 shows a case where $4^3$ is mapped into $8^2$.

Referring to FIGS. 16 and 17, the mapping method B (referred to as a tile method) is to sequentially arrange those units sliced along the ZX plane. Thus, the units in the directions Z and X are arranged adjacent while the units in the direction Y are regularly arranged (spaced at a distance corresponding to the number of slices).

More specifically, (a) in a three-dimensional calculation model, calculation units in directions X, Y, and Z are defined as VCX, VCY, and VCZ, respectively, while the numbers of division in the directions X, Y, and Z are defined as VX, VY, and VZ, respectively. At the same time, in a two-dimensional physical processor array to be subjected to mapping, the numbers of the X-directional physical processors and the Y-directional physical processors are defined as PCX and PCY, respectively. The numbers of division in the directions X and Y are defined as PX and PY, respectively. Thus, the physical processors are divided into groups.

(b) The three-dimensional calculation model is divided by VX=0, VY=0, and YZ=VCZ to form rectangular units called main units. Each main unit is assigned with a serial number (main unit number). The numbers of the X-directional and the Y-directional calculation units of the main unit are represented by vx and vy, respectively. Simultaneously, in the two-dimensional physical processor array, the processors are divided by PX=PCX/vx and PY=PCY/vy into groups. Each group is assigned with a serial number (group number).

Figure 19:
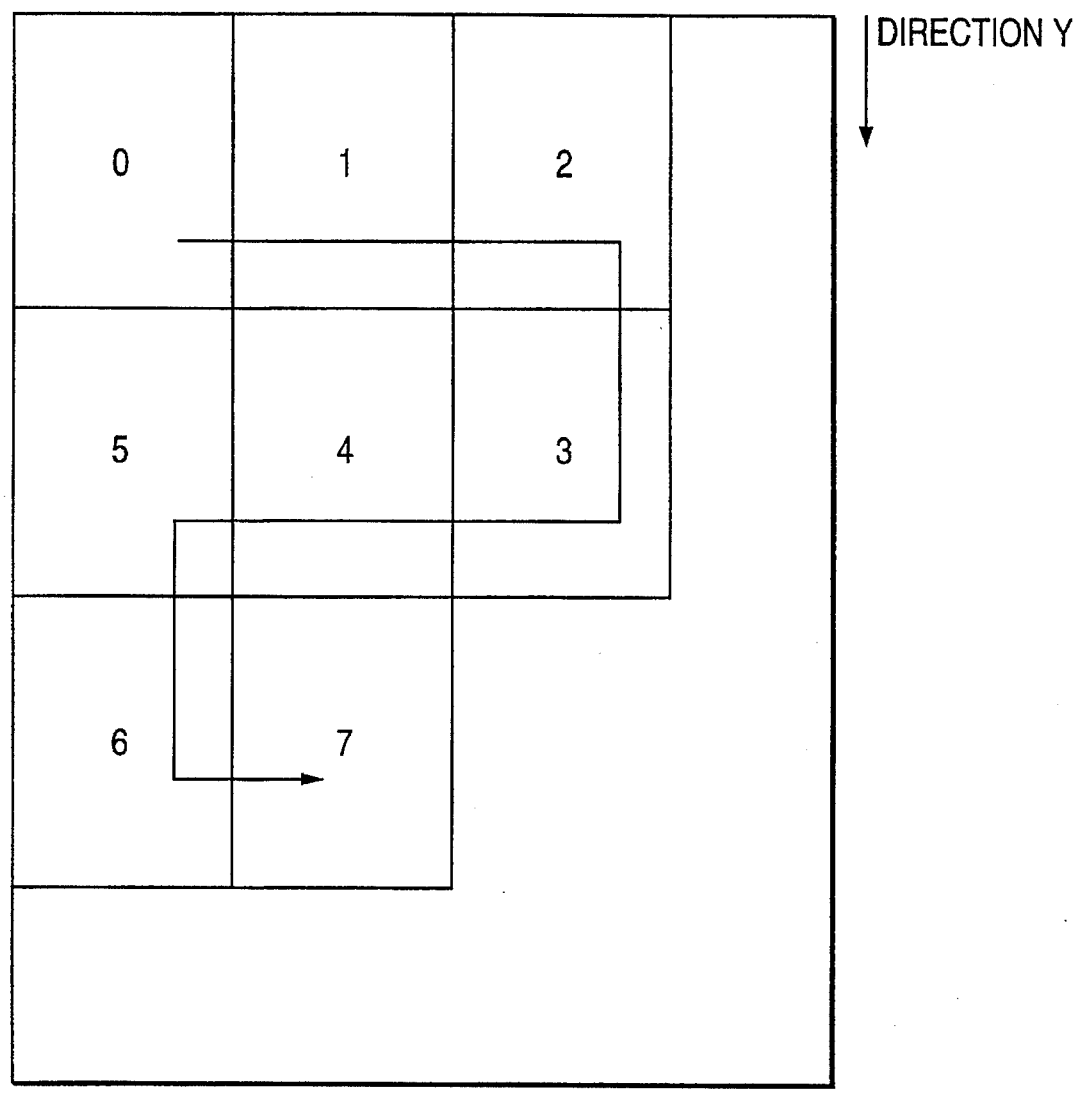
FIG. 19 shows another example of the mapping operation.

In addition, (c) corresponding to the position represented by vx=PX and vy=PY, the main units are sequentially arranged along the direction X of the two-dimensional physical processor array in the order of the serial numbers, as shown in FIG. 19. When reaching the physical processor at one end in the direction X, the line of arrangement is shifted along the direction Y. Then, the main units are sequentially arranged reversely in the direction X in the order of the serial numbers. When reaching the physical processor at the opposite end in the direction X, the line of arrangement is shifted again in the direction Y. Thereafter, mapping is repeated in the above-mentioned zigzag fashion.

*Simulation Mapping

Next, description will be made of a method of obtaining optimum mapping by the use of simulation. The problem of optimization of mapping is understood as determination of an optimum combination which minimize the total sum of the distances.

It is assumed that the communication cost due to mapping is exactly equivalent to the total sum of the distances between the nearest neighborhood lattices.

Figure 20:
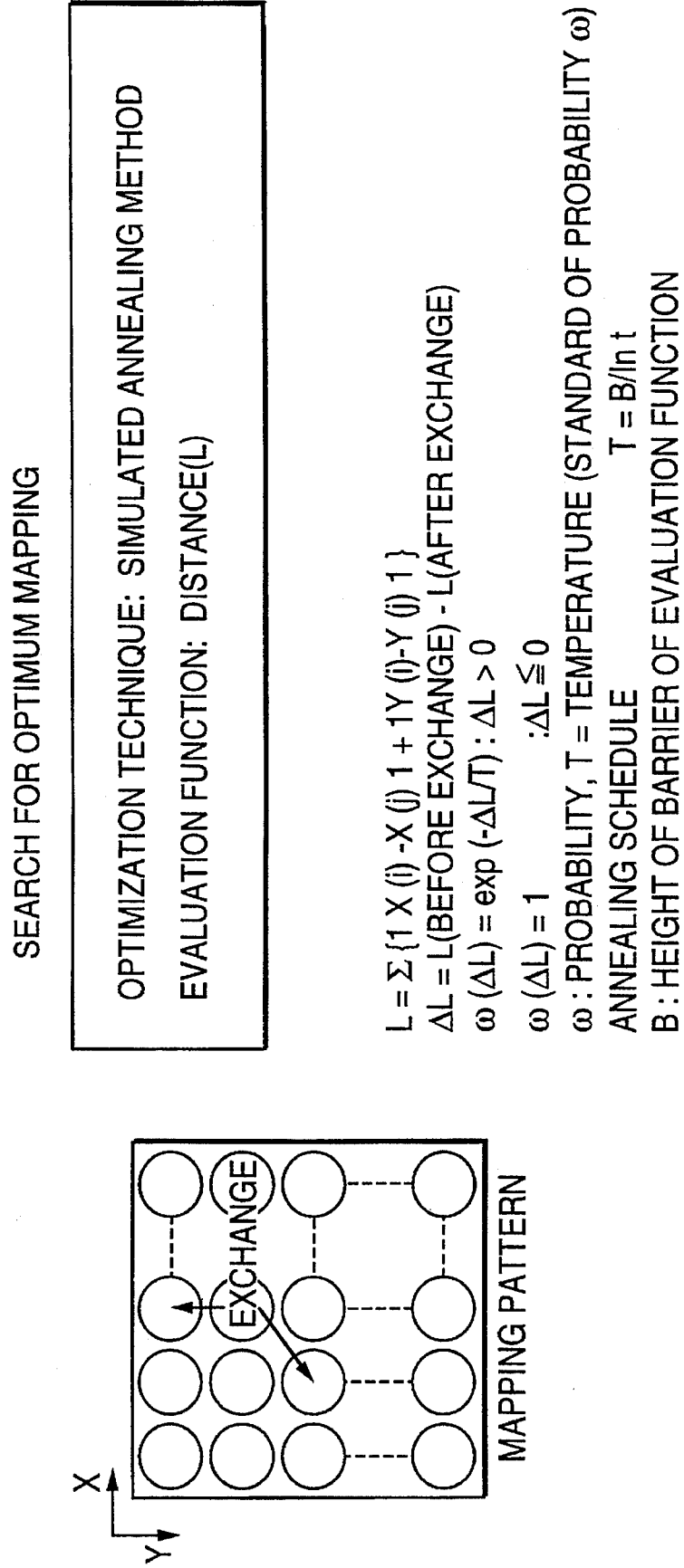
FIG. 20 of search for an optimum mapping pattern.

The method will presently be described. Random mapping is performed and a total sum of the paths is calculated in an initial state. As shown in FIG. 20, exchange is made between a pair of units optionally selected. If the total sum of paths is reduced, the exchange is adopted. By repeating the exchange, the variation of the total sum becomes small. Such a state is adopted as an approximate solution.

Specifically, it is assumed that adjacent lattice points Pi and Pj are mapped into particular points (Xi, Yi) and (Xj, Yj) on a two-dimensional lattice pattern. The distance lij between Pi and Pj is represented by:

$$lij = |Xi - Xj| + |Yi - Yj|$$

Accordingly, the evaluation function is represented by $L = \Sigma lij$. When the evaluation function has a minimum value, the state of mapping is approximately optimum. (Although the minimum value is obtained when all lattice points are converged into unity, no overlapping of lattice points is supposed to occur by the exchange). However, the presence of a local minimum is confirmed in such a relaxation method. Accordingly, the communication cost is not always minimum when ΔL has a minimum value.

*Annealing Method

As an approximate solution to optimization of combination, use is made of the simulated annealing method [4] proposed by S. Kirkpatrick et al in 1983. This method introduces a probability to escape the local minimum into a process of varying the evaluation function to become smaller. The probability is represented by ω while the standard (the parameter determining the probability) is represented by T.

$\omega(\Delta L)=\exp(-\Delta L/T), \Delta L>0$ $\omega(\Delta L)=1, \Delta L<0$ ΔL=L (before exchange)–L (after exchange): Variation of Distance When T (the parameter determining the probability) is gradually reduced (the probability is reduced), the evaluation function approaches the minimum value.

The way of decreasing T (Annealing Schedule) is disclosed by Geman brothers (S. Geman and D. Geman 1984).

$T(t)=B/\ln t$ $T(t) \to 0 (t \to \text{infinity})$

Figure 21:
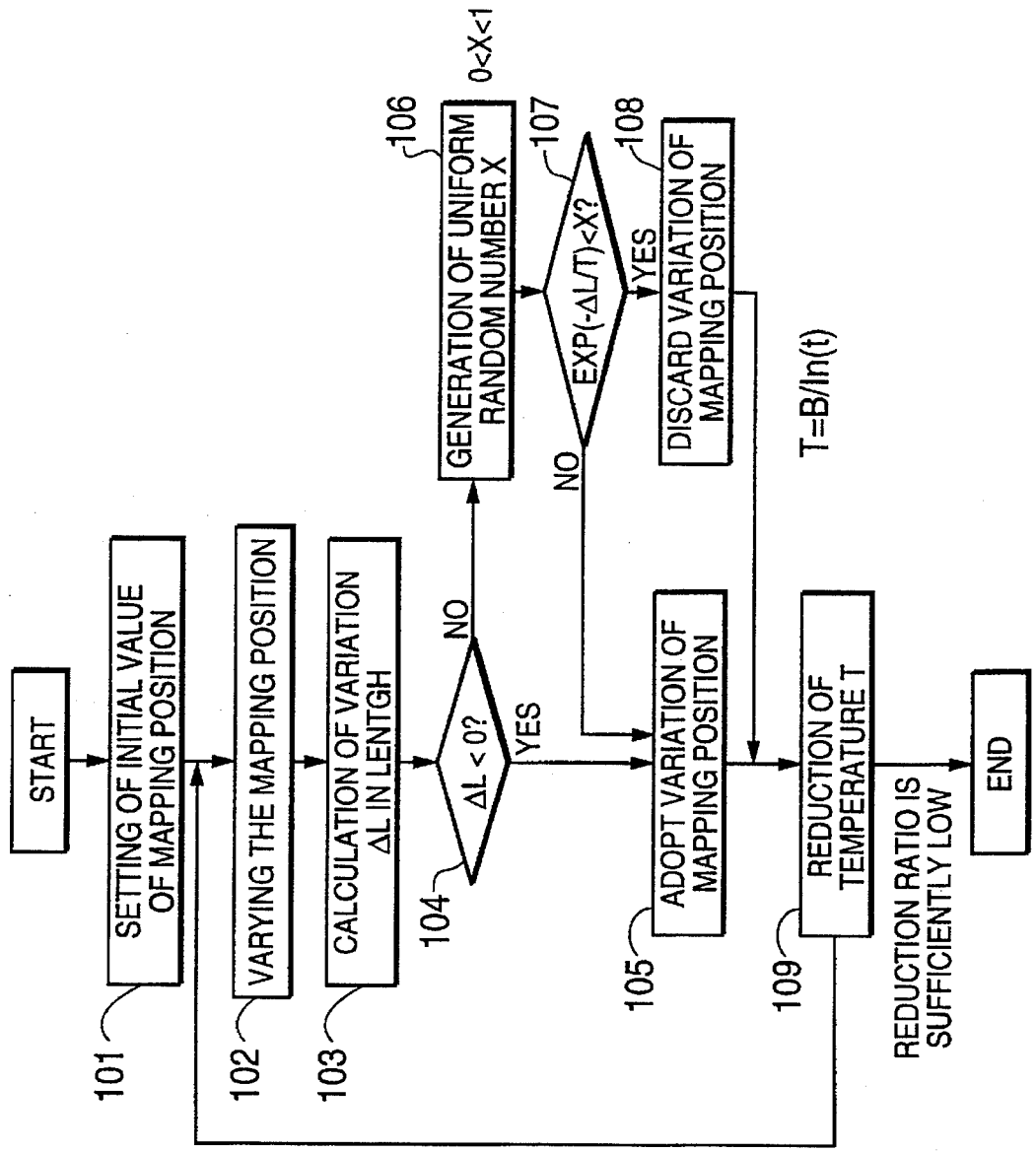
FIG. 21 shows an algorithm of a simulated annealing method.

B: Height of the barrier of the evaluation function FIG. 21 shows the algorithm of the annealing method.

After an initial mapping position is determined (Step 101), (1) the mapping position is changed (Step 102). (2) The variation of length (variation of the above-mentioned total sum of the distances) ΔL is calculated (Step 103). (3) When ΔL<0, the change of the mapping position is adopted (Steps 104 and 105). (4) When ΔL<0 does not hold, a random number X (0<X<1) is extracted (Step 106) and exp(–ΔL/T) is calculated (T is a parameter or a standard in determining the probability. For example, a natural number is substituted therefor.) (Step 107). (5) When exp(–ΔL/T)<X, the change of the mapping position is not adopted (Step 108). (6) When exp(–ΔL/T)<X does not hold, the change of the mapping position is adopted (Step 105). The processing from (1) to (6) is repeated with the value T reduced (Step 109). Thus, optimum mapping is finally obtained. It is found out from the empirical rule that L is sufficiently decreased when the number of times of repetition of (1) to (6) is on the order of 1,000,000. Accordingly, by preliminarily supplying the number of times of repetition of the loop, an optimum L is obtained. A break point may be provided to interrupt the processing loop when the above-mentioned step (5) is repeated consecutively by a predetermined number of times.

Figure 22:
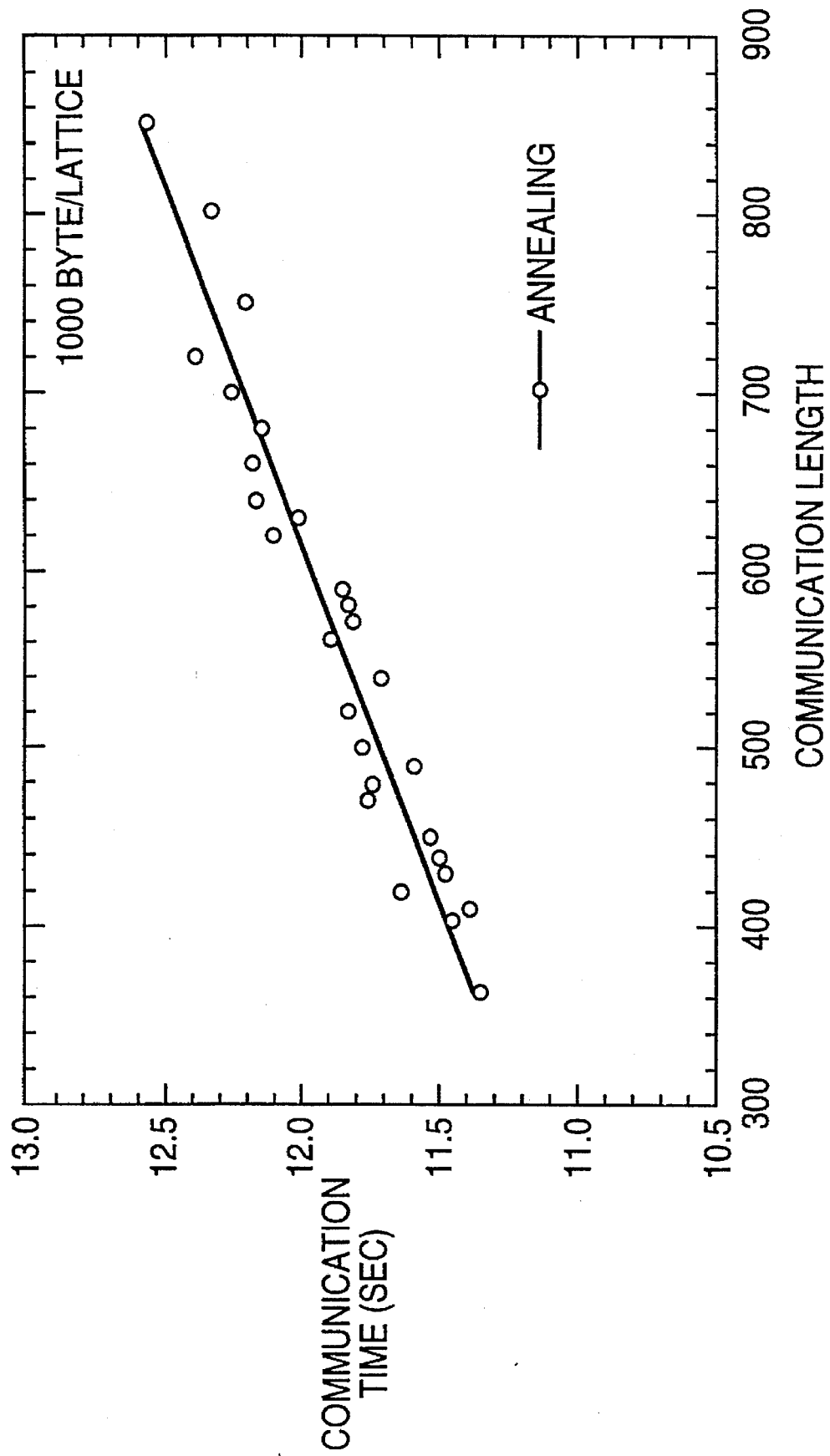
FIG. 22 shows a difference in communication time dependent on an evaluation function (distance)

FIG. 22 shows a reduction of the communication time attained by the annealing method.

<Result>

The mapping results obtained by the annealing method are shown in FIGS. 23 and 26 in conjunction with the cases of $3^3$ into $8^2$ and $4^3$ into $8^2$, respectively. (The numerals in the figure represent XYZ coordinates.)

Simultaneously, the mapping results are obtained by the above-mentioned empirical mapping in conjunction with the A-pattern method (the skip method) and the B-pattern method (the tile method). The case of $3^3$ into $8^2$ is illustrated in FIGS. 24 and 25. The case of $4^3$ into $8^2$ is illustrated in FIGS. 27 and 28.

<Evaluation of Mapping>

As shown in FIG. 29, comparison is made between the mapping obtained by simulation and the mapping empirically obtained with respect to the total sum (L) of the distances.

In case of $3^3$ into $8^2$, the total sum of the distances is smaller and a better result is obtained in the mapping of this technique than in the empirically obtained mapping. However, it may not be the best mapping. In case of $4^3$ into $8^2$, the result is similar to the empirically obtained mapping.

<Storage in Database>

The optimum mapping information obtained by the above-mentioned mapping is registered in the database in a file format illustrated in FIG. 30.

How to use the database is illustrated in FIG. 7 as described above.

<Conclusion>

As described, the distance is used as the evaluation function. The annealing method is used when the three-dimensional lattice model of the nearest neighborhood reference pattern is mapped into the two-dimensional torus network. Thus, a better result is relatively easily obtained as compared with the empirical mapping. Further improvement of the accuracy of the evaluation function will be effective in dealing with highly multi-dimensional mapping to which the empirical technique is not applicable.

Although the above-mentioned embodiment is described in conjunction with AP1000, this invention is also applicable to any other parallel computers inasmuch as the above-mentioned user interface is realized.

<Parallel Processing of Optimization of Mapping>

Figure 31:
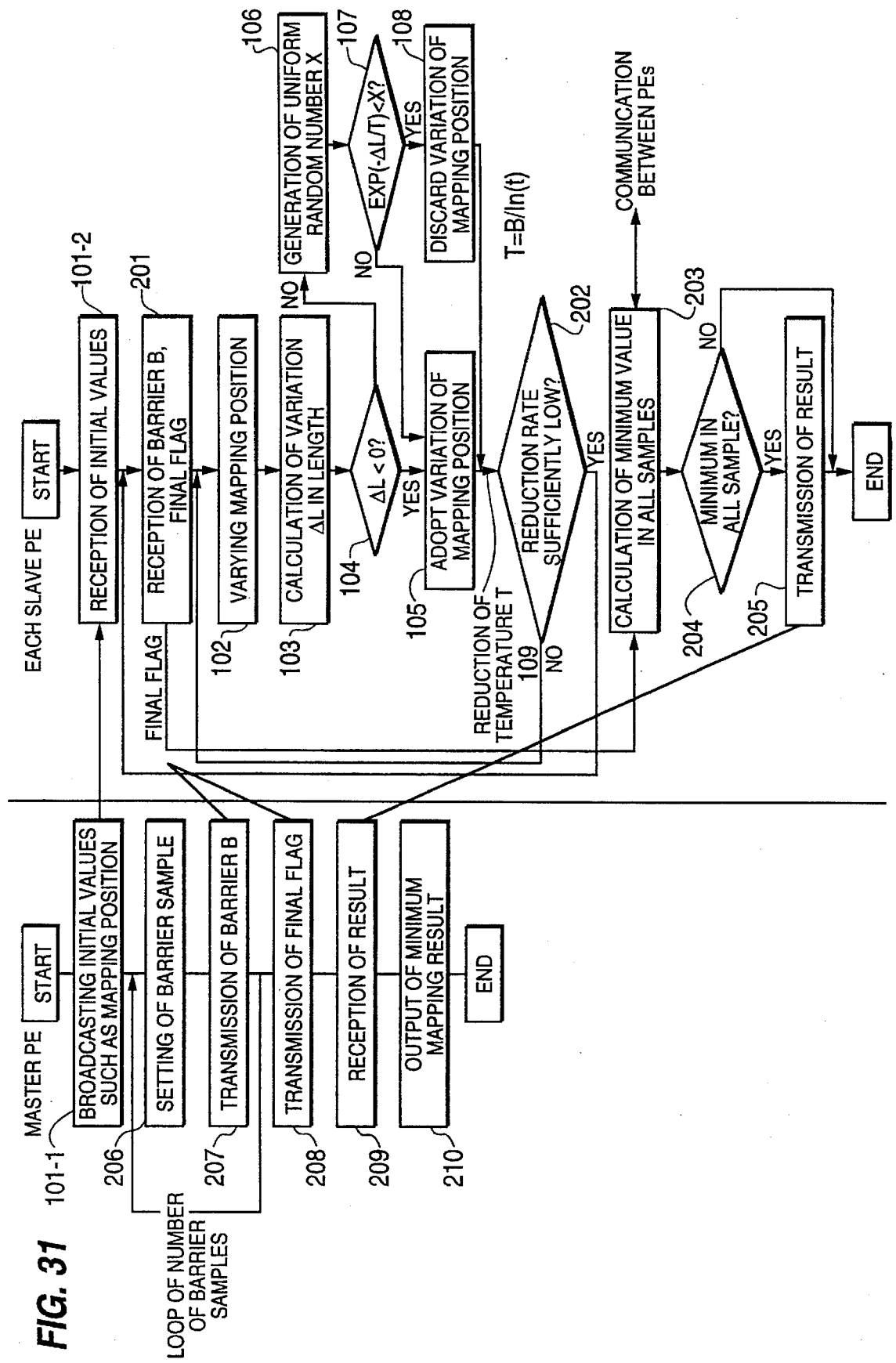
FIG. 31 is a flow chart when optimization of mapping is carried out by parallel processing.

FIG. 31 shows a case where the optimization of mapping is carried out through parallel processing.

For brevity of description, it is assumed that parallel processing is carried out by two processors.

At first, a master processor broadcasts initial values such as mapping positions to a slave processor (Steps 101-1). The master processor carries out setting of a barrier sample (Step 206). The barrier B is transmitted to the slave processor (Step 207). The steps 206 and 207 are repeatedly carried out and a final flag is transmitted to the slave processor (Step 208). The final flag indicates whether or not the following loop is carried out.

The slave processor receives the initial values to carry out an initial setting operation (Step 101-2). Then, the above-mentioned barrier B is received (Step 201) and the mapping positions are changed (Step 102). Thereafter, variation of length (variation of the above-mentioned total sum of the distances) ΔL is calculated (Step 103). When ΔL<0, the change of the mapping position is adopted (Steps 104 and 105). When ΔL<0 does not hold, a random number X (0<X<1) is extracted (Step 106) and exp(–ΔL/T) is calculated (T is a parameter or a standard in determining the probability. For example, a natural number is substituted therefor.) (Step 107). When exp(–ΔL/T)<X, the change of the mapping position is not adopted (Step 108). When exp(–ΔL/T)<X does not hold, the change of the mapping position is adopted (Step 105). Subsequently, the value T is reduced (Step 109). Judgment is made whether or not the reduction ratio is sufficiently small (Step 203). When the target value is not reached, the processing from the step 201 to 109 is repeated.

When the final flag is received at the step 201, the processing from the step 102 to 202 is skipped and the minimum value in all samples is calculated (Step 203). Judgment is made whether or not "the total sum of the distances between PEs" is minimum in all samples (Step 204). If it is minimum in all samples, the result is transmitted to the master processor (Step 205). The master processor produces the minimum mapping result (Step 210) and the processing is finished. If judgment is made in the step 204 in the slave processor that it is not minimum in all samples, the processing is finished without transmitting the result to the master processor. Herein, "all samples" are respective samples in all cells, namely, a mapping pattern in which the evaluation function in a particular cell has a minimum value.

By the parallel processing, optimization of mapping is carried out at a high speed.

As described above, according to this invention, it is possible to perform optimum mapping in the user space without concern for the architecture of the parallel computer. Accordingly, it is possible to readily realize high-speed parallel processing.

What is claimed is:

1. A method of mapping an N-dimensional calculation model in a parallel computer, the parallel computer including a plurality of processors for implementing parallel processing in a parallel fashion by transferring data and information among the processors from one to another through communication means, said method comprising the steps of:
   a) dividing the N-dimensional calculation model into a plurality of calculation units each having an identification code;
   b) establishing an address conversion table that indicates the location of the processors assigned to said calculation units;
   c) mapping the calculation units into the processors through an address conversion table; and
   d) implementing interprocessor communication by the identification codes assigned to the calculation units.

2. A method of mapping a calculation model in a parallel computer as claimed in claim 1, wherein a total sum L of interprocessor distances is used as a communication cost evaluation function, and said mapping step c) being carried out so that the total sum L is minimized.

3. A method of mapping a calculation model in a parallel computer as claimed in claim 2, wherein, when adjacent lattice points Pi and Pj of the calculation units are mapped into particular points (Xi, Yi) and (Xj, Yj) on a two-dimensional lattice pattern, a distance lij between Pi and Pj being represented by:

$$lij = |Xi - Xj| + |Yi - Yj|,$$

the evaluation function being represented by $L = \Sigma lij$, optimum mapping being obtained when the evaluation function has a minimum value.

4. A method of mapping a calculation model in a parallel computer as claimed in claim 2, further comprising the steps of:
   e) changing a mapping position after determining an initial mapping position;
   f) calculating a variation of length $\Delta L$;
   g) adopting a change of the mapping position when $\Delta L < 0$;
   h) extracting a random number X ($0 < X$ 1) when $\Delta L < 0$ does not hold and calculating $\exp(-\Delta L/T)$, T being a parameter or a standard in determining a probability;
   i) not adopting the change of the mapping position when $\exp(-\Delta L/T) < X$;
   j) adopting the change of the mapping position when $\exp(-\Delta L/T) < X$ does not hold; and
   k) repeating processing from steps e) to j) with T reduced.

5. A method of mapping a calculation model in a parallel computer as claimed in claim 4, wherein processing is carried out in a parallel fashion.

6. A method of mapping a calculation model in a parallel computer as claimed in claim 1, wherein said mapping step c) includes the substeps of:
   i) spatially dividing a three-dimensional calculation model into calculation units in three directions X, Y, and Z;
   ii) mapping the calculation units into processors in a two-dimensional array;
   iii) dividing the three-dimensional calculation model into a plurality of calculation units, n in number, in a ZX plane;
   iv) arranging the calculation units in the direction Y adjacent in square in the two-dimensional array; and
   v) arranging the calculation units in direction Z and X at every second position.

7. A method of mapping a calculation model in a parallel computer as claimed in claim 6, further comprising the steps of:
   vi) defining in the three-dimensional calculation model, the calculation units in directions X, Y, and Z as VCX, VCY, and VCZ, respectively, while defining numbers of division in the directions X, Y, and Z as VX, VY, and VZ, respectively;
   vii) mapping the two-dimensional array;
   viii) defining numbers of X-directional processors and Y-directional processors as PCX and PCY, respectively;
   ix) defining numbers of division in the directions X and Y as PX and PY, respectively;
   x) dividing the processors into groups;
   xi) dividing the three-dimensional calculation model by VX=PCX/2, VY=PCY/2, and YZ=0 to form rectangular units called main units, each main unit being assigned with a serial number (main unit number);
   xii) further dividing the main unit into four in the direction Z to form resultant units called subunits, each subunit being assigned a serial number (subunit number);
   xiii) dividing the two-dimensional array, the processors being divided by PX=PCX/2 and PY=PCY/2 into groups, each group being assigned a serial number (group number);
   iv) scattering and mapping subunit numbers 0 to 3 into the group of physical processors having a group number similar to a main unit number of the three-dimensional model so that 0 and 1, 1 and 2, 2 and 3, 3 and 0 are respectively adjacent.

8. A method of mapping a calculation model in a parallel computer as claimed in claim 1, wherein said mapping step c) comprises the substeps of:
   i) spatially dividing a three-dimensional calculation model into calculation units in three directions X, Y, and Z;
   ii) mapping the calculation units into processors in a two-dimensional array;
   iii) dividing the three-dimensional calculation model into a plurality of calculation units, n in number, in a ZX plane; and
   iv) sequentially arranging the calculation units in the two-dimensional array so that the calculation units in directions Z and X are arranged adjacent while the calculation units in the direction Y are regularly arranged.

9. A method of mapping a calculation model in a parallel computer as claimed in claim 8, wherein said substep iv) comprises, in the three-dimensional calculation model;

aa) defining the calculation units in directions X, Y, and Z as VCX, VCY, and VCZ, respectively, while numbers of division in the directions X, Y, and Z are defined as VX, VY, and VZ, respectively;

bb) dividing the three-dimensional calculation model by VX=0, VY=0, and YZ=VCZ to form rectangular units called main Units, each main unit being assigned a serial main unit number, numbers of the X-directional and the Y-directional calculation units of the main unit being represented by vx and vy, respectively;

said substep ii) comprises, in the two-dimensional array subjected to mapping;

aa) defining numbers of X-directional processors and Y-directional processors as PCX and PCY, respectively;

bb) defining numbers of division in directions X and Y as PX and PY, respectively; and cc) dividing the processors into groups;

dd) dividing processors by PX=PCX/vx and PY=PCY/vy into groups, each group being assigned a serial group number;

ee) sequentially arranging the main units along the direction X of the two-dimensional array in the order of the serial group numbers corresponding to a position represented by vx=PX and vy=PY and shifting an arrangement along the direction Y when reaching the processor at one end in the direction X; and ff) sequentially arranging the main units reversely in the direction X in an order of serial group numbers, shifting an arrangement again in the direction Y when reaching the processor at an opposite end in the direction X, and repeating mapping in a zigzag fashion.

10. A method of mapping a calculation model in a parallel computer as claimed in claim 1, said step c) further comprises the substeps of:

i) storing, in a database, optimum mapping patterns obtained by said mapping step c); and ii) selecting a particular optimum mapping pattern adapted to a particular calculation model with reference to the database to carry out parallel processing.

11. A communication library program for use in a parallel computer, the parallel computer including a plurality of processors for implementing processing in a parallel fashion by transferring data and information among the processors from one to another through communication means, the communication library program being used in implementing parallel processing by the plurality of processors to calculate an N-dimensional calculation model to be executed and processed at a user's demand, said communication library program comprising:

a dividing routine for dividing said N-dimensional calculation model into a plurality of calculation units each having an identification code;

a supervising routine for establishing an address conversion table that indicates the location of the processors assigned to said calculation units; and a mapping routine for desiredly mapping said calculation units into the plurality of processors, through an address conversion table, and implementing interprocessor communication by the identification codes assigned to the calculation units.

12. A communication library program for use in a parallel computer as claimed in claim 11, wherein a total sum L of interprocessor distances is used as a communication cost evaluation function in said mapping routine, said mapping being carried out so that said total sum L is minimized.

13. A communication library program for use in a parallel computer as claimed in claim 12, wherein, when adjacent lattice points PI and Pj of said calculation units are mapped into particular points (Xi, Yi) and (Xj, Yj) on a two-dimensional lattice pattern, the distance IiJ between Pi and Pj is represented by:

$$lij=|Xi-Xj|+|Yi-Yj|,$$

said evaluation function being represented by $L=\Sigma lij$, optimum mapping being obtained when said evaluation function has a minimum value.

14. A communication library program for use in a parallel computer as claimed in claim 12, comprising the steps of:

a) changing a mapping position after determining an initial mapping position;

b) calculating a variation of length (variation of said total sum of the distances) $\Delta L$;

c) adopting the change of the mapping position when $\Delta L<0$;

d) extracting a random number X ($0<X<1$) when $\Delta L<0$ does not hold and calculating $\exp(-\Delta L/T)$ (T being a parameter or a standard in determining a probability);

e) not adopting the change of the mapping position when $\exp(-\Delta L/T)$ X;

f) adopting the change of the mapping position when $\exp(-\Delta L/T)<X$ does not hold; and g) repeating processing of steps (a) to (f) with T reduced.

15. A communication library program for use in a parallel computer as claimed in claim 14, wherein processing is carried out in a parallel fashion.

16. A communication library program for use in a parallel computer as claimed in claim 11, said mapping being such that a three-dimensional calculation model is spatially divided into calculation units in three directions X, Y, and Z and said calculation units are mapped into processors in a two-dimensional array, wherein:

said three-dimensional calculation model is divided into a plurality of calculation units, n in number, in a ZX plane, the calculation units in the direction Y being arranged adjacent in square in said two-dimensional array, said calculation units in directions Z and X being arranged at every second positions.

17. A communication library program for us in a parallel computer as claimed in claim 16, wherein:

in said three-dimensional calculation model, said calculation units in directions X, Y, and Z are defined as VCX, VCY, and VCZ, respectively, while numbers of division in the directions X, Y, and Z are defined as VX, VY, and VZ, respectively;

in said two-dimensional array subjected to mapping, numbers of X-directional processors and Y-directional processors being defined as PCX and PCY, respectively, the numbers of division in the directions X and Y being defined as PX and PY, respectively, said processors being divided into groups;

said three-dimensional calculation model being divided by VX=PCX/2, VY=PCY/2, and YZ=0 to form rectangular units called main units, each main unit being assigned with a serial said main unit being further divided into four in the direction Z to form resultant units called subunits, each subunit being assigned a serial number (subunit number);

in said two-dimensional array, said processors being divided by PX=PCX/2 and PY=PCY/2 into groups, each group being assigned a serial; and subunit numbers 0 to 3 being scattered and mapped into said processors having the group number similar to the main unit number of said three-dimensional model so that 0 and 1, 1 and 2, 2 and 3, 3 and 0 are respectively adjacent.

18. A communication library program for use in a parallel computer as claimed in claim 11, said mapping being such that a three-dimensional calculation model is spatially divided into calculation units in three directions X, Y, and Z and said calculation units are mapped into processors in a two-dimensional array, wherein:

said three-dimensional calculation model is divided into a plurality of calculation units, n in number, in a ZX plane, said calculation units being sequentially arranged in said two-dimensional array so that said calculation units in the directions Z and X are arranged while said calculation units in the direction Y are regularly arranged (spaced at a distance corresponding to n units).

19. A communication library program for use in a parallel computer as claimed in claim 18, wherein:

in said three-dimensional calculation model, calculation units in directions X, Y, and Z are defined as VCX, VCY, and VCZ, respectively, while numbers of division in the directions X, Y, and Z are defined as VX, VY, and VZ, respectively;

in a two-dimensional array subjected to mapping, numbers of X-directional processors and Y-directional processors being defined as PCX and PCY, respectively, numbers of division in the directions X and Y being defined as PX and PY, respectively, said processors being divided into groups;

said three-dimensional calculation model being divided by VX=0, VY=0, and YZ=VCZ to form rectangular units called main units, each main unit being assigned a serial, numbers of the X-directional and the Y-directional calculation units of said main unit being represented by vx and vy, respectively;

in said two-dimensional array, said processors being divided by PX=PXC/vx and PY=PCY/vy into groups, each group being assigned a serial;

corresponding to a position represented by vx=PX and vy=PY, said main units being sequentially arranged along the direction X of said two-dimensional array in an order of the group numbers, an arrangement being shifted along the direction Y when reaching the processor at one end in the direction X, said main units being sequentially arranged reversely in the direction X in an order of the serial main unit numbers, an arrangement being shifted again in the direction Y when reaching the processor at an opposite end in the direction X, mapping being thereafter repeated in a zigzag fashion.

20. A communication library program for use in a parallel computer as claimed in claim 11, wherein optimum mapping patterns obtained by said mapping are stored in a database, a particular optimum mapping pattern adapted to a particular calculation model being selected with reference to said database to carry out parallel processing.

21. A parallel computer including a plurality of processors for implementing parallel processing by transferring data and information among said processors from one to another through communication means to calculate an N-dimensional calculation model to be executed and processed at a user's demand, said parallel computer comprising:

a calculation model dividing section for dividing an N-dimensional calculation model into a plurality of calculation units each having an identification code;

a supervising section for establishing an address conversion table that indicates the location of the processors assigned to said calculation units; and a mapping section for desiredly mapping said calculation units into said processors through an address conversion table, interprocessor communication being carried out by the identification codes assigned to said calculation units.

22. A parallel computer as claimed in claim 21, wherein said mapping section comprises an interprocessor distance calculating unit for calculating a total sum L of interprocessor distances as a communication cost evaluation function, optimum mapping being obtained when said total sum L has a minimum value.

23. A parallel computer as claimed in claim 22, wherein said mapping section comprises a judging unit for judging whether or not the total sum L obtained by said interprocessor distance calculating unit has a minimum value, optimum mapping being obtained when the total sum L has a minimum value.

24. A parallel computer as claimed in claim 22, which changes a mapping position after determining an initial mapping position, calculates a variation of length $\Delta L$, adopts the change of said mapping position when $\Delta L<0$, extracts a random number X ($0<X<1$) when $\Delta L<0$ does not hold, calculates $\exp(-\Delta L/T)$ (T being a parameter or a standard in determining a probability), does not adopt the change of said mapping position when $\exp(-\Delta L/T)<X$, adopts the change of said mapping position when $\exp(-\Delta L/T)<X$ does not hold, and repeats processing from with T reduced.

25. A parallel computer as claimed in claim 24, wherein processing is carried out in a parallel fashion.

26. A parallel computer as claimed in claim 21, wherein, when adjacent lattice points Pi and Pj of said calculation units are mapped into particular points (Xi, Yi) and (Xj, Yj) on a two-dimensional lattice pattern, a distance Iij between Pi and Pj is represented by:

$$Iij = |Xi - Xj| + |Yi - Yj|,$$

said evaluation function being represented by $L = \Sigma Iij$, optimum mapping being obtained when said evaluation function has a minimum value.

27. A parallel computer as claimed in claim 21, wherein said mapping section being operable so that a three-dimensional calculation model is spatially divided into calculation units in three directions X, Y, and Z and said calculation units are mapped into processors in a two-dimensional array, wherein:

said three-dimensional calculation model is divided into a plurality of calculation units, n in number, in a ZX plane, the calculation units in the direction Y being arranged adjacent in square in said two-dimensional processor array, the calculation units in directions Z and X being arranged at every second position.

28. A parallel computer as claimed in claim 27, wherein:

in said three-dimensional calculation model, said calculation units in directions X, Y, and Z are defined as VCX, VCY, and VCZ, respectively, while numbers of division in the directions X, Y, and Z are defined as VX, VY, and VZ, respectively;

in a two-dimensional processor array subjected to mapping, numbers of X-directional processors and Y-directional processors being defined as PCX and PCY, respectively, numbers of division in the directions X and Y being defined as PX and PY, respectively, said processors being divided into groups;

said three-dimensional calculation model being divided by VX=PCX/2, VY=PCY/2, and YZ=0 to form rectangular units called main units, each main unit being assigned with a serial, said main unit being further divided into four in the direction Z to form resultant units called subunits, each subunit being assigned with a serial;

in said two-dimensional array, said processors being divided by PX=PCX/2 and PY=PCY/2 into groups, each group being assigned with a serial;

subunit numbers 0 to 3 being scattered and mapped into the group of said physical processors having the group number similar to the main unit number of said three-dimensional model so that 0 and 1, 1 and 2, 2 and 3, 3 and 0 are respectively adjacent.

29. A parallel computer as claimed in claim 21, said mapping section being operable so that a three-dimensional calculation model is spatially divided into calculation units in three directions X, Y, and Z and said calculation units are mapped into processors in a two-dimensional array, wherein:

said three-dimensional calculation model is divided into a plurality of calculation units, n in number, in a ZX plane, said calculation units being sequentially arranged in said two-dimensional array so that the calculation units in directions Z and X are arranged adjacent while the calculation units in the direction Y are regularly arranged (spaced at a distance corresponding to n units).

30. A parallel computer as claimed in claim 29, wherein:

in said three-dimensional calculation model, calculation units in directions X, Y, and Z are defined as VCX, VCY, and VCZ, respectively, while numbers of division in the directions X, Y, and Z are defined as VX, VY, and VZ, respectively;

in a two-dimensional array subjected to mapping, numbers of X-directional processors and Y-directional processors being defined as PCX and PCY, respectively, numbers of division in the directions X and Y being defined as PX and PY, respectively, said processors being divided into groups;

said three-dimensional calculation model being divided by VX=0, VY=0 and YZ=VCZ to form rectangular units called main units, each main unit being assigned with a serial, numbers of the X-directional and the Y-directional calculation units of said main unit being represented by vx and vy, respectively;

in said two-dimensional processor array, said processors being divided by PX=PCX/vx and PY=PCY/vy into groups, each group being assigned with a serial;

corresponding to a position represented by vx=PX and vy=PY, said main units being sequentially arranged along the direction X of said two-dimensional array in an order of the serial main unit numbers, an arrangement being shifted along the direction Y when reaching the processor at one end in the direction X, said main units being then sequentially arranged reversely in the direction X in an order of the serial main unit numbers, an arrangement being shifted again in the direction Y when reaching the processor at an opposite end in the direction X, mapping being thereafter repeated in a zigzag fashion.

31. A parallel computer as claimed in claim 21, further comprising a database section, optimum mapping patterns obtained by said mapping being stored in said database section, a particular optimum mapping pattern adapted to a particular calculation model being selected with reference to said database section to carry out parallel processing.

* * * * *